(12) United States Patent
Reed

(10) Patent No.: US 12,462,226 B2
(45) Date of Patent: *Nov. 4, 2025

(54) METHOD AND SYSTEM FOR ACQUIRING, TRACKING, AND TESTING ASSET SAMPLE DATA

(71) Applicant: Scott D. Reed, Wheeling, WV (US)

(72) Inventor: Scott D. Reed, Wheeling, WV (US)

( * ) Notice: Subject to any disclaimer, the term of this patent is extended or adjusted under 35 U.S.C. 154(b) by 549 days.

This patent is subject to a terminal disclaimer.

(21) Appl. No.: 17/687,921

(22) Filed: Mar. 7, 2022

(65) Prior Publication Data

US 2022/0188310 A1 Jun. 16, 2022

Related U.S. Application Data

(63) Continuation of application No. 16/698,416, filed on Nov. 27, 2019, now Pat. No. 11,269,883.

(51) Int. Cl.
*G06Q 10/20* (2023.01)
*G05B 19/4155* (2006.01)
(Continued)

(52) U.S. Cl.
CPC ......... *G06Q 10/20* (2013.01); *G06F 16/2379* (2019.01); *G06F 16/2455* (2019.01);
(Continued)

(58) Field of Classification Search
CPC .. G06Q 10/20; G06Q 10/087; G06F 16/2379; G06F 16/2455; G06F 16/252;
(Continued)

(56) References Cited

U.S. PATENT DOCUMENTS 8,397,128 B1 3/2013 Alonzo et al.
8,600,932 B2 12/2013 Poling et al.
(Continued)

FOREIGN PATENT DOCUMENTS

CN 110378446 2/2020
EP 1862807 8/2010
(Continued)

OTHER PUBLICATIONS

Gill (Electrical power equipment maintenance and testing. New York, NY [u.a.]: Dekker. ISBN 9780824799076, 1998) (Year: 1998).*

(Continued)

*Primary Examiner* — Lisa M Caputo
*Assistant Examiner* — Christian T Bryant
(74) *Attorney, Agent, or Firm* — Hawley Troxell; Rivkah Young

(57) ABSTRACT

Asset data is collected from one or more asset managers and stored in a known asset database. The known asset database enables tracking and maintenance of assets associated with each asset manager. One or more field technicians may also be associated with assets in the known asset database. A field technician is provided with access to a field asset management application on a mobile device, which allows the field technician to provide data associated with asset samples. Asset sample data is then correlated with asset data. Once an asset sample has been correlated with an asset, a field technician or other party is presented with an interface through an asset management application, allowing the party to place one or more requests for tests to be performed on one or more asset samples. Once the one or more tests are performed, test results data is provided.

29 Claims, 14 Drawing Sheets

(51) Int. Cl.

| | |
|---|---|
| *G05B 23/02* | (2006.01) |
| *G06F 3/0482* | (2013.01) |
| *G06F 16/23* | (2019.01) |
| *G06F 16/2455* | (2019.01) |
| *G06F 16/25* | (2019.01) |
| *G06K 7/14* | (2006.01) |
| *G06Q 10/087* | (2023.01) |
| *G06V 20/10* | (2022.01) |
| *G06V 30/10* | (2022.01) |
| *G07C 3/00* | (2006.01) |
| *G07C 5/00* | (2006.01) |
| *G07C 5/08* | (2006.01) |

(52) U.S. Cl.
CPC ......... *G06F 16/252* (2019.01); *G06K 7/1413* (2013.01); *G06V 20/10* (2022.01); *G07C 3/00* (2013.01); *G07C 5/008* (2013.01); *G07C 5/08* (2013.01); *G05B 19/4155* (2013.01); *G05B 23/02* (2013.01); *G05B 23/0272* (2013.01); *G05B 23/0283* (2013.01); *G06F 3/0482* (2013.01); *G06Q 10/087* (2013.01); *G06V 30/10* (2022.01)

(58) Field of Classification Search
CPC .... G06F 3/0482; G06K 7/1413; G06V 20/10; G06V 30/10; G07C 3/00; G07C 5/008; G07C 5/08; G05B 23/0283; G05B 23/0272; G05B 19/4155; G05B 23/02
See application file for complete search history.

(56) References Cited

U.S. PATENT DOCUMENTS

| | | |
|---|---|---|
| 10,409,553 B2 | 9/2019 | Mody et al. |
| 2002/0198858 A1 | 12/2002 | Stanley et al. |
| 2003/0144981 A1 | 7/2003 | Schrof et al. |
| 2005/0222933 A1 | 10/2005 | Wesby |
| 2006/0200391 A1 | 9/2006 | Taylor |
| 2010/0127067 A1 | 5/2010 | Eisenberg |
| 2012/0069131 A1 | 3/2012 | Abelow |
| 2013/0073473 A1 | 3/2013 | Heath |
| 2014/0207862 A1* | 7/2014 | Domke .................. G06Q 10/06 709/204 |
| 2015/0066782 A1* | 3/2015 | Vainberg ................ G06Q 10/20 705/305 |
| 2015/0088434 A1 | 3/2015 | Grabau et al. |
| 2015/0186809 A1 | 7/2015 | Hawaldar et al. |
| 2015/0242286 A1 | 8/2015 | Altini |
| 2015/0242592 A1 | 8/2015 | Weiss et al. |
| 2015/0262120 A1 | 9/2015 | Kulig et al. |
| 2015/0278219 A1 | 10/2015 | Phipps |
| 2015/0287318 A1 | 10/2015 | Galeev |
| 2016/0379134 A1 | 12/2016 | Kochut et al. |
| 2017/0058645 A1 | 3/2017 | Hunter |
| 2017/0098268 A1 | 4/2017 | Karvela et al. |
| 2017/0192414 A1* | 7/2017 | Mukkamala .......... H04L 43/045 |
| 2017/0199967 A1 | 7/2017 | De La Torre-Bueno |
| 2017/0318166 A1 | 11/2017 | Wall Warner |
| 2018/0322590 A1 | 11/2018 | Sundararajan et al. |
| 2019/0101898 A1 | 4/2019 | Middendorf et al. |
| 2019/0213061 A1 | 7/2019 | Campos et al. |
| 2019/0294990 A1 | 9/2019 | Lopez de Prado |
| 2019/0297055 A1 | 9/2019 | May et al. |
| 2019/0303450 A1 | 10/2019 | Richards et al. |
| 2020/0183811 A1 | 6/2020 | Krishnan et al. |
| 2020/0184419 A1 | 6/2020 | Watling |

FOREIGN PATENT DOCUMENTS

| | | |
|---|---|---|
| JP | 2016/511865 | 4/2016 |
| KR | 10-2022496 | 9/2019 |
| WO | WO 2011/014912 | 2/2011 |

OTHER PUBLICATIONS

Wikipedia ("Transformer oil testing." Wikipedia, The Free Encyclopedia. Wikipedia, The Free Encyclopedia, Oct. 14, 2019) (Year: 2019).*

Waldo ("Methods of Testing Transformer Oil", University of Illinois, Thesis, 1913) (Year: 1913).*

* cited by examiner

FIG. 8A

800 Create Your Asset
802

| Serial Number | X93521 |
| Company | MVA Diagnostics, In |
| Substation Location | Front St. Sub |
| Unit ID | |
| Status | In Service |
| Equipment | Transformer |

| Status | In Service |
| Equipment Type | Transformer | ← 804
| Manufacturer 802 | —None— |

806
Transformer
Oil Circuit Breaker
Voltage Regulator
Furnace Transformer
Network Transformer
Current or Potential Transformer Done

- KVA Rating: 12000
- Gals: 3245
- Fluid Type: Natural Ester
- Phases: 3
- Breather Configuration: Sealed

SAVE — 816

- Gals
- Fluid Type: Mineral Oil
- Phases: 3
- Breather Configuration: --Not Reported-- — 813

SAVE 802
800

815 —
--Not Reported--
Sealed
Free Breather
Conservator
Free Breather with Desiccant Done

METHOD AND SYSTEM FOR ACQUIRING, TRACKING, AND TESTING ASSET SAMPLE DATA

RELATED APPLICATIONS

This application claims priority to U.S. application Ser. No. 16/698,416, filed in the name of Scott D. Reed on Nov. 27, 2019, entitled "METHOD AND SYSTEM FOR ACQUIRING, TRACKING, AND TESTING ASSET SAMPLE DATA," which is hereby incorporated by reference in its entirety as if it were fully set forth herein.

This application is related to U.S. patent application Ser. No. 17/688,185, naming Scott D. Reed as inventor, filed concurrently with the present application on Mar. 7, 2022, entitled "METHOD AND SYSTEM FOR ACQUIRING, TRACKING, AND TESTING SAMPLE DATA," which is hereby incorporated by reference in its entirety as if it were fully set forth herein.

BACKGROUND

Numerous types of mechanical and electrical devices and equipment are utilized daily for a vast array of personal, residential, commercial, and industrial applications. For example, equipment such as transformers, generators, and voltage regulators play crucial roles in the distribution of electricity and power to billions of people worldwide. In addition to the value provided as a result of the functions they perform, this equipment is also often of significant value in and of itself. As such, it is very important to ensure that these valuable assets are safely and effectively functioning at all times. To this end, periodic testing and maintenance is routinely performed on these assets. In many fields of endeavor, testing and maintaining these assets requires collection of physical samples from the assets. For example, in the case of an oil-filled transformer, a sample of the transformer oil may be collected. Then a variety of tests can be performed on the sample to determine whether the transformer is operating safely, effectively, and efficiently.

Tests such as these are traditionally performed by technicians and other specialists, who travel to physical locations of one or more assets in order to collect physical samples from those assets. Herein, these technicians and other specialists are referred to as "field technicians." Once one or more physical samples are collected, data associated with those samples typically need to be logged and tracked in order to ensure correct and efficient processing of the samples. Data associated with an asset and an asset sample may include data such as serial number, location of the asset, unit ID, status, equipment type, manufacturer, fluid type, etc.

In order to process asset samples, a technician often needs to travel to the physical location of the asset, and manually transfer any serial number, model type, or other identifying data associated with the asset and/or the asset sample into a log book, form, or other record-keeping tool. Unfortunately, manual entry of asset and sample data often creates a significant burden on the individual tasked with this job, and frequently results in data entry errors that could otherwise be avoided.

For example, assets may be located in a wide variety of locations which may be subject to unfavorable geographical and/or weather conditions. The assets may be located in remote locations which expose the assets to dirt, mud, dust, or debris, which often makes proper identification of the assets a problematic task. Some assets may be located in difficult or hard to reach places, for example, in the basements of industrial facilities such as steel mills, or outdoors in rural areas on top of telephone poles. Therefore, servicing an asset may require the use of specialized equipment or vehicles such as bucket trucks. Further, a field technician may need to contend with any possible weather conditions such as rain, wind, snow, or extreme heat/cold. Therefore, manually correlating the asset and asset sample data under varying conditions is often difficult and time-consuming, and may result in a variety of issues, such as lost records, correlating the sample data to the wrong asset, running the wrong tests, or running unnecessary tests instead of the correct and necessary tests. Further, complications such as these may require a field technician to return to the asset site to obtain the correct data, and therefore valuable time, energy, and money may be wasted.

Additionally, in order to perform analysis on an asset sample, large quantities of asset and asset sample data must be obtained to ensure that the assets and asset samples conform to industry standards. Traditionally, these large quantities of data are recorded manually every time an asset is sampled. Typically, assets are sampled yearly, at a minimum, and if any data entry errors are discovered during the sampling and testing process, alternative approaches must be taken to confirm which asset was actually sampled and tested.

What is needed, therefore, is a method and system to efficiently acquire data associated with assets and asset samples collected in the field and to accurately and reliably correlate the collected data with the correct assets and test requests to ensure that the assets continue to operate safely and effectively. Utilizing the embodiments disclosed herein, the correct asset is efficiently, accurately, and reliably identified and correlated with the corresponding asset sample data, which offers tremendous value to any asset manager responsible for the retrieval and testing of asset sample and asset sample data.

SUMMARY

Embodiments of the present disclosure provide an effective and efficient technical solution to the technical problem of maintaining asset functionality through the acquisition, tracking, and testing of asset sample data. In various embodiments, one or more managers of one or more assets are provided with access to an asset management application. Asset data is then obtained for the assets associated with the one or more asset managers through an asset management application, and the asset data is stored as known asset data in a known asset database. As used herein, the term "asset manager" may refer to an owner of one or more assets, a manager of one or more assets, a field or other technician responsible for servicing one or more assets, and/or any other asset service provider. In one embodiment, the asset data associated with one or more of an asset manager's assets is initially provided directly by the asset manager through the asset management application, which may be a desktop or mobile computing system application. In various other embodiments, the asset data may initially be collected from one or more third party sources.

In one embodiment, the known asset database enables one or more asset managers to be associated with one or more assets, thereby allowing each of the asset managers to track and maintain those assets. In one embodiment, a single asset manager is associated with one or more assets, however, in other embodiments, multiple asset managers may be associated with a single asset. For example, one asset may be associated with an asset owner as well as several asset field technicians or other technicians.

In some embodiments, once an asset manager has been associated with one or more assets, one or more field technicians are provided with a mobile user interface to a field asset management application. In one embodiment, the field asset management application allows the field technician to collect and provide data associated with assets and asset samples through a mobile device. Typically, asset sample data is collected in the field by a field technician, however in some embodiments, asset sample data may be collected in the field by an asset owner, asset manager, or other asset service provider or technician. Thus, the term "field technician" is used herein to describe any individual responsible for collecting asset sample data in the field using the field asset management application on a mobile device. Consequently, a field technician may be an asset owner, asset manager, asset technician, and/or asset service provider.

In one embodiment, the field technician provides the field asset management application with current asset identification data, which identifies an asset from which a current asset sample is to be obtained. The field technician then provides the field asset management application with current asset sample identification data, which represents identification data associated with the current asset sample obtained by the field technician from the current asset. The current asset data and the current asset sample data may be provided by the field technician through the field asset management application in various forms, such as, but not limited to, a textual string, an image/scan of a barcode or serial number associated with the current asset or current asset sample, or an image of a label that otherwise identifies the current asset or current asset sample.

In one embodiment, once current asset identification data is obtained in the field by a field technician using the field asset management application, the current asset identification data and the known asset data from the known asset database is then analyzed to determine whether the current asset exists in the known asset database. Upon a determination that the current asset exists in the known asset database, the current asset sample identification data is then correlated with the current asset identification data, where the current asset identification data identifies an asset associated with the field technician in the known asset database. In some embodiments, it may be determined that the current asset does not exist in the known asset database. In one embodiment, if the current asset does not exist in the known asset database, the field technician may then be prompted to either correct any erroneous data entry or to create a new asset through a user interface of the field asset management application. In various embodiments, a new asset can be created based on textual asset data, image asset data, or asset barcode data provided by the field technician.

In one embodiment, geolocation data may be utilized to identify a current asset based on assets known to be located near the geolocation of the field technician. The field technician may be provided with a listing of determined known nearby assets to select from, and the asset selected by the field technician may be identified as the current asset. In one embodiment, the current asset may be identified using the field technician's geolocation data without any direct input from the field technician. In various embodiments, the geolocation data of the field technician is obtained from the mobile device through which the field asset management application is provided to the field technician.

In one embodiment, once the current asset sample identification data has been correlated with the current asset identification data, the field technician is provided with a test request user interface through the field asset management application. The test request user interface allows the field technician to provide test request data, which represents one or more tests to be run on the current asset sample represented by the asset sample identification data. In one embodiment, once the field technician has provided test request data to the field asset management application, test request summary data is provided to the field technician through the field asset management application. Upon confirmation of the test request summary data, the current asset sample identification data and the current asset identification data are correlated with the test request summary data, and the correlated asset, sample, and test data may be stored in the known asset database.

In various embodiments, once the field technician has provided test request data for an asset sample, the field technician may be prompted to repeat the process for any additional asset samples that the field technician might wish to have tested. In some embodiments, when a field technician is not able to connect to the internet, any provided current asset data, current asset sample data, or test request data may be stored offline on the field technician's mobile device and then later synchronized with the known asset database upon restoration of internet connection.

Once the correlated asset, sample, and test data have been stored in the known asset database, the correlated asset, sample, and test data may be retrieved from the known asset database by an asset owner, asset manager, asset technician, and/or any other asset service provider or technician, through the asset management application. The retrieved correlated asset, sample, and test data may then be analyzed and the one or more tests represented by the test request data are performed on the one or more current asset samples represented by the current asset sample identification data. Once the one or more tests have been performed on a current asset sample, test results data may be provided through the asset management application and/or through the field asset management application.

Therefore, as discussed in more detail below, the embodiments disclosed herein allow for the effective and efficient acquisition, correlation, tracking, and testing of data associated with asset samples collected in the field, and as such, the collected asset sample data is reliably correlated with the correct assets and test requests to ensure that the assets continue to operate safely and effectively.

BRIEF DESCRIPTION OF THE DRAWINGS

FIGS. 8A-8G are exemplary screenshots of asset creation interfaces in accordance with one embodiment.

Figure 1:
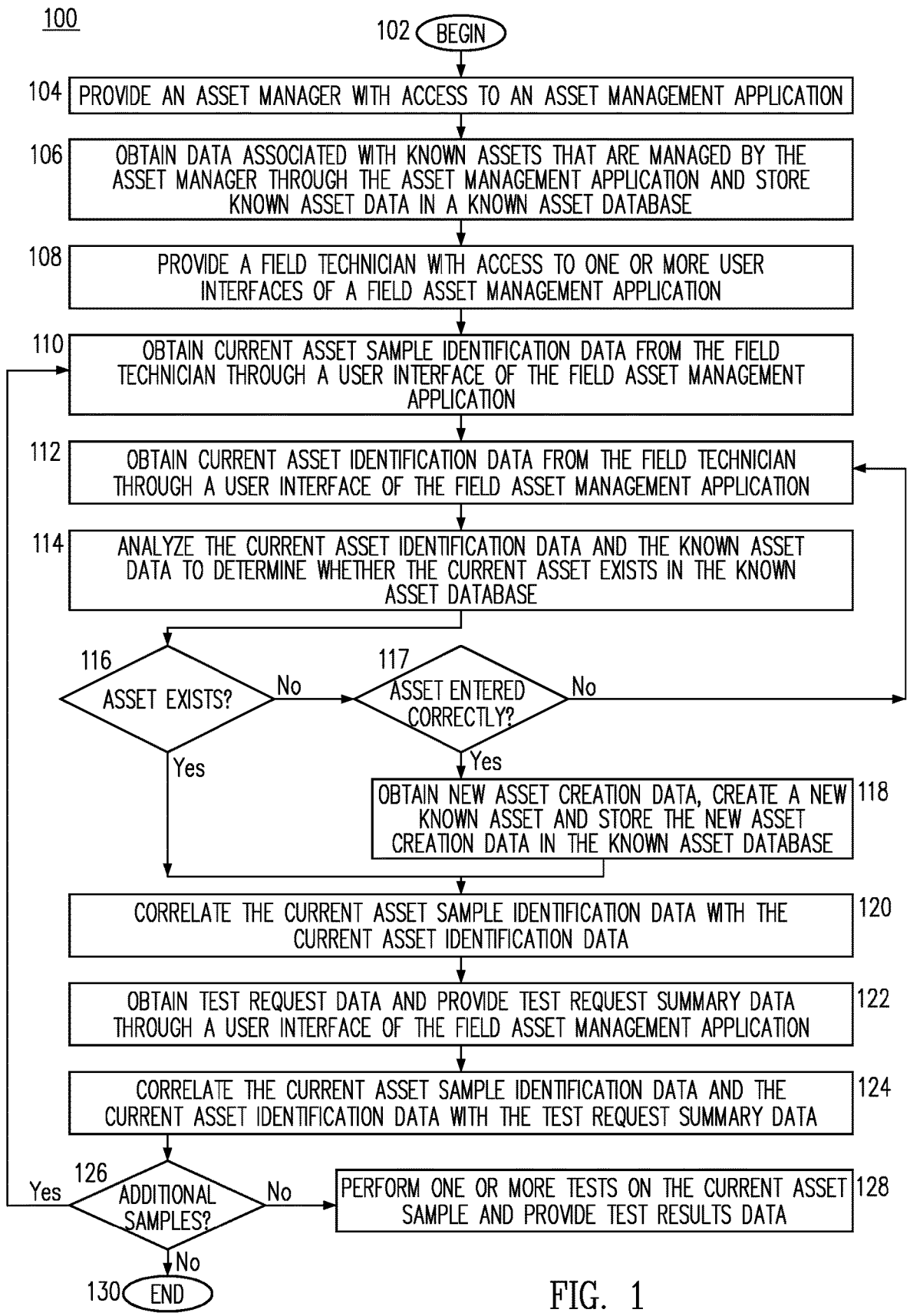
FIG. 1 is a flow chart of a process for acquiring, tracking, and testing asset sample data in accordance with one embodiment.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

Embodiments of the present disclosure provide an effective and efficient technical solution to the technical problem of maintaining asset functionality through the acquisition, tracking, and testing of asset sample data. In the disclosed embodiments, asset data is obtained for assets associated with one or more asset managers through an asset management application, and the asset data is stored as known asset data in a known asset database. The known asset database enables tracking and maintenance of the assets associated with each asset manager. Herein, an asset manager may be an asset owner, asset manager, asset technician, or other asset service provider associated with one or more assets. An asset owner, asset manager, asset technician, or other asset service provider may also be referred to as a field technician, which, herein, is defined as an individual responsible for collecting asset samples from assets in the field.

In one embodiment, once a field technician has been associated with one or more assets through an asset management application, the field technician is provided with a mobile user interface through a field asset management application, which allows the field technician to obtain and provide asset and asset sample data collected in the field. The asset sample data is then correlated with the corresponding asset. In one embodiment, once the asset sample has been correlated with the corresponding asset, the field technician is presented with a user interface through the field asset management application, which allows the field technician to place one or more requests for tests to be performed on the asset sample. Once the one or more tests have been performed, test results data is provided through the asset management application or the field asset management application.

Process

FIG. 1 is a flow chart of a process 100 for acquiring, tracking, and testing asset sample data in accordance with one embodiment. Process 100 begins at BEGIN 102 and process flow proceeds to 104. At 104, an asset manager is provided with access to an asset management application.

As used herein, the term "asset manager" may refer to an owner of one or more assets, a manager of one or more assets, a field or other technician responsible for servicing one or more assets, and/or any other asset service provider or agent for an asset service provider. In one embodiment, the asset manager may be any company or organization that has been given access to an asset management application. An asset manager may also be an individual or group of individuals associated with a company or organization that has been given access to an asset management application. In some embodiments, an asset manager may be a third party not directly associated with any company or organization.

In various embodiments, the asset management application may be any type of application that is capable of providing and receiving information to/from an asset manager through a user interface, including, but not limited to, a desktop computing system application, a mobile computing system application, a virtual reality computing system application, an application provided by an Internet of Things (IoT) device, or any combination thereof. In various embodiments, the application user interface may include any combination of a graphical user interface, an audio-based user interface, a touch-based user interface, or any other type of user interface currently known to those of skill in the art, or any other type of user interface that may be developed after the time of filing.

In one embodiment, once an asset manager is provided with access to an asset management application at 104, process flow proceeds to 106. In one embodiment, at 106, data associated with known assets managed by an asset manager is obtained and stored in a known asset database.

In the embodiments disclosed herein, an asset is any type of equipment that may require testing and/or maintenance. Examples of assets include, but are not limited to, transformers, generators, voltage regulators, wind turbines, vehicle equipment, mining equipment, hauling equipment, farming equipment, aviation equipment, oil and gas equipment, shipboard and marine equipment, equipment engines, and equipment motors. Examples of environmental testing that may need to be performed on these assets include, but are not limited to, testing for temperature, salt spray, humidity, vibration, pressure, acoustics, and/or electromagnetic interference as well as testing of lubricants, hydraulic and other petrochemicals that may be used in these assets.

In various embodiments, the asset data may be obtained directly from the asset manager through the asset management interface. The known asset data obtained from the asset manager may include any data related to one or more assets associated with the asset manager. For example, the known asset data may include asset information such as asset name, asset model, asset type, asset serial number, asset unit ID, asset manufacturer, recommended asset maintenance schedule, or any other data that may be associated with an asset.

In various embodiments, the asset management application may obtain data associated with an asset manager in addition to obtaining data about the asset manager's assets. Asset manager data obtained may include data such as, but not limited to, the name of the asset manager, the geographical location associated with the asset manager, payment information associated with the asset manager, historical information associated with previous asset tests that were requested by the asset manager, and/or any other asset manager data that may be beneficial for the operation of the disclosed embodiments.

In some embodiments, in addition to, or instead of, known asset data being obtained directly from an asset manager, known asset data may be obtained from one or more third party computing systems, such as, but not limited to, a computing system associated with an asset distributor or asset manufacturer. For example, known asset data may be collected from one or more databases maintained by the distributor or manufacturer of one or more assets associated with an asset manager. In some embodiments the known asset data may be collected from one or more websites associated with an asset distributor or manufacturer using a variety of data acquisition techniques, such as, but not limited to, screen scraping.

As one illustrative example, an asset owner may be a company that owns assets responsible for supplying power to a particular geographical region. The asset owner company may have any number of employees, and one or more of these employees may be in charge of managing the asset owner's assets on behalf of the asset owner. One or more of these asset managers may then request access to the asset management application on behalf of the asset owner. The asset management application may be an application provided to an asset manager through a website, which is accessible from a desktop computer or a mobile device.

Continuing with the above illustrative example, before or after the asset manager is granted access to the asset management application, the asset manager may be requested to provide identifying information through a user interface provided by the asset management application. The asset management application may also request that the asset manager provide information associated with one or more of the asset owner's assets. The asset management application may further request that the asset manager identify any individuals who should be associated with one or more of the asset owner's assets. Such individuals may include, but are not limited to, other asset managers acting on behalf of the asset owner, asset technicians who may be responsible for servicing one or more of the asset owner's assets, or any other asset service provider that may provide asset related services on behalf of the asset owner.

Continuing the above illustrative example, an asset manager who is an employee of a power company may identify one or more transformers owned by the power company as assets that should be associated with the asset manager. The asset manager may further provide data identifying the type and make of the transformers. For example, the asset manager may identify a transformer as an oil-filled transformer made by a particular manufacturer. Once a type and manufacturer are identified, further asset data may be requested from the asset manager. Further asset data may also be acquired from a third-party computing system, such as from a website associated with the manufacturer of the asset. The asset manager may further be provided with a listing of oil-filled transformers made by that manufacturer, and the asset manager may then be prompted to select a specific transformer model. Once the asset manager has selected the specific transformer model, the transformer asset becomes associated with both the power company and the asset manager and this data may be stored in the known asset database, which is accessible by the asset management application. The asset manager may also indicate, through the user interface of the asset management application, that several additional individuals should be associated with the transformer asset. For example, an asset technician or team of asset technicians may be associated with the transformer asset, and this data may be also be stored in the known asset database.

It should be noted that the above example is for illustrative purposes only and should not be construed as limiting the invention as set forth herein. For example, an asset manager can be one or more individuals associated with any type of company. Further, the asset owner can be an individual instead of a company, and the asset owner may also be considered the asset manager. The asset manager can also be an asset service provider, who may utilize the asset management application on behalf of one or more asset owner clients without the need to grant the asset owner clients access to the asset management application. Further, the asset management application does not need to be a web-based application. As noted above, the asset management application can be any type of application, such as, but not limited to, a stand-alone application that does not provide a web-based interface.

In one embodiment, once known asset data is obtained from one or more asset managers and stored in the known asset database at 106, process flow proceeds to 108. In one embodiment, at 108, a field technician is provided with one or more mobile user interfaces through a field asset management application.

As already discussed above, as used herein, the term "field technician" may refer to an asset owner, asset manager, asset technician, or other asset service provider who is responsible for collecting asset sample data in the field using the field asset management application on a mobile device.

In one embodiment, the field asset management application is an application provided on a mobile device, and the mobile device may be any type of device that is portable and capable of providing and receiving information to/from a field technician through a user interface, including, but not limited to, a laptop computer, a mobile phone, a handheld scanning device, an Internet of Things (IoT) device, or any other type of mobile device currently known to those of skill in the art, or any other type of mobile device that may be developed after the time of filing.

In various embodiments, the user interface provided by the field asset management application may include any combination of a graphical user interface, an audio-based user interface, a touch-based user interface, or any other type of user interface currently known to those of skill in the art, or any other type of user interface that may be developed after the time of filing.

Figure 3:
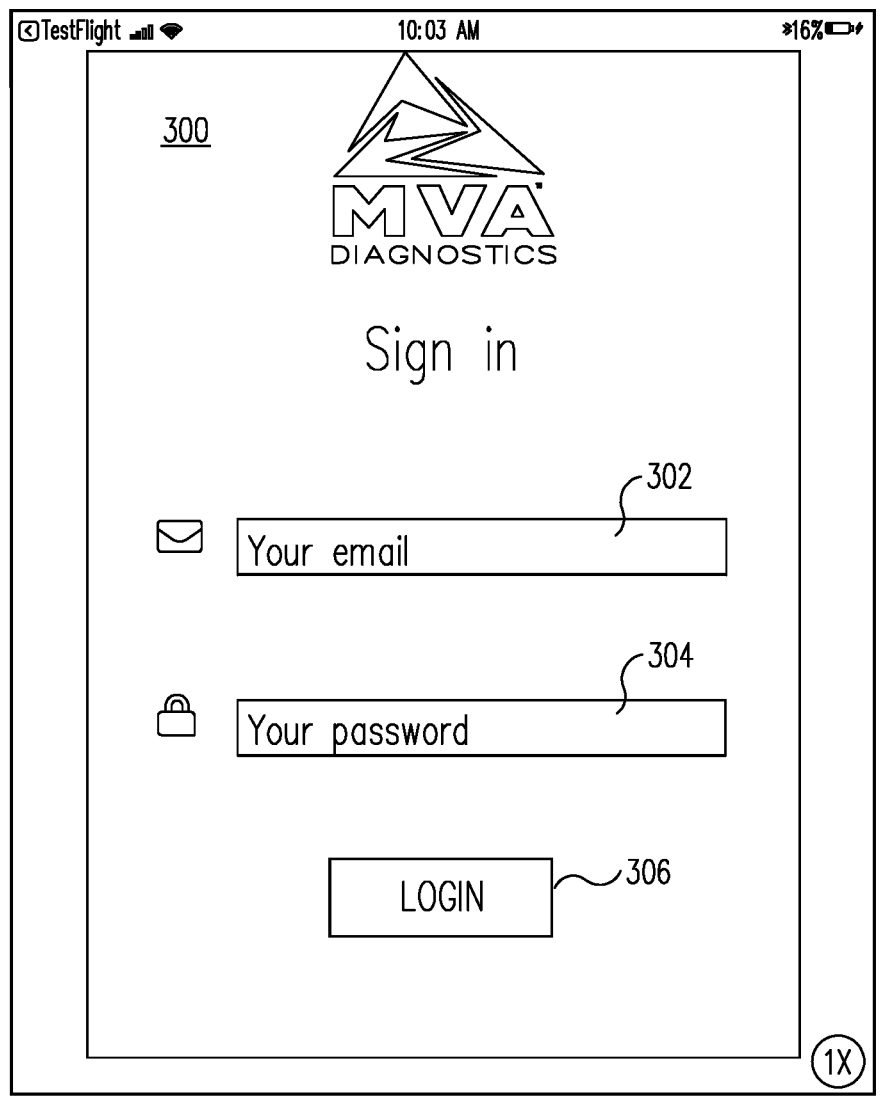
FIG. 3 is an exemplary screenshot of a login screen associated with an application user interface for acquiring, tracking, and testing asset sample data in accordance with one embodiment.

In one embodiment, the field technician is provided with a user interface to the field asset management application, and the field technician may be prompted to enter authentication credentials in order to proceed. As one illustrative example, FIG. 3 depicts an exemplary screenshot of a login screen 300 associated with a user interface provided by the field asset management application, in accordance with one embodiment. In the illustrative embodiment of FIG. 3, the field technician is presented with a prompt to enter authentication credentials including email credential 302 and password credential 304. In one embodiment, the field technician may already have existing login credentials, for example, such as login credentials associated with previously being granted access to the asset management application. If the field technician has an existing email credential 302 and password credential 304, the field technician may then proceed to log into the field asset management application through login element 306. In another embodiment, the field technician may not have previously accessed the asset management application, and so may not have existing email credential 302 and password credential 304, in which case, the field technician may be prompted to create new login credentials. In various other embodiments, credentials that are required to log into the field asset management application may be credentials other than email credential 302 and password credential 304. For example, a username may be required in place of, or in addition to, email credential 302. Further, alternative or additional authentication techniques may be used to grant a field technician access to the field asset management application, including for example, fingerprint authentication, voice authentication, and/or facial recognition.

Returning again to FIG. 1, in one embodiment, once a field technician is provided with one or more user interfaces through the field asset management application at 108, process flow proceeds to 110. In one embodiment, at 110, current asset sample identification data is obtained through a user interface of the field asset management application.

Figure 4:
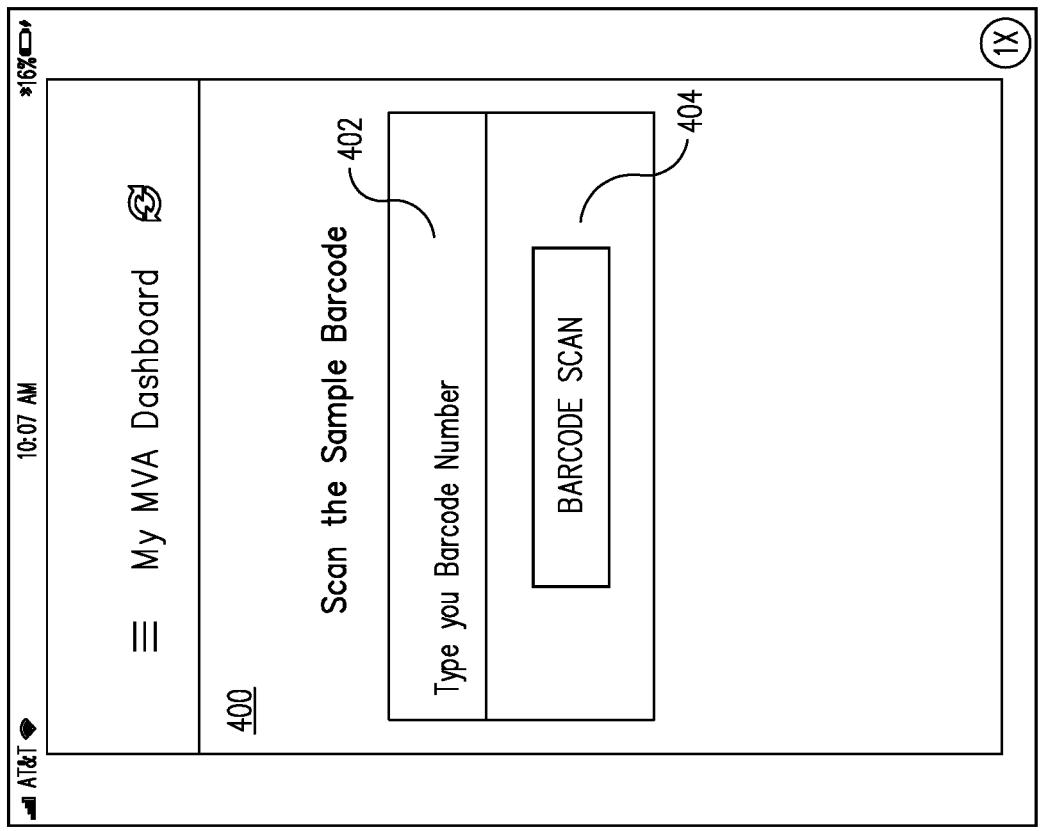
FIG. 4 is an exemplary screenshot of an asset identification interface in accordance with one embodiment.

FIG. 4 depicts an exemplary screenshot of an asset sample identification interface 400, which is a portion of the field asset management application user interface, and is utilized for obtaining current asset sample identification data, in accordance with one embodiment. In one embodiment, the field technician may manually enter a barcode number, or other identifying data associated with a current asset sample, into barcode number field 402 of sample identification interface 400. In another embodiment the field technician may elect to use the mobile device that is running the field asset management application to scan a barcode associated with the current asset sample, or to scan other identifying current asset sample data, by selecting barcode scan element 404. In some embodiments, a field technician is also given an option to take a photograph of the current asset sample and/or current asset sample identification data for later processing.

In various embodiments, prior to scanning or otherwise capturing the current asset sample identification data, a current asset sample must first be obtained by the field technician. In general, an asset sample may be any type of sample associated with an asset. However, typically a particular type of asset sample is selected such that testing the asset sample will yield valuable information about the asset. As one specific illustrative example, if the asset is an oil-filled transformer, then running one or more tests on the oil in the transformer can yield information about the status and functionality of the transformer. Therefore, in this illustrative example, the oil in the transformer would be extracted from the transformer and stored in a container for later testing. The transformer oil that is stored in the container would then be referred to as the asset sample, and identification information would typically be placed on the asset sample container.

In various embodiments, asset sample types include, but are not limited to, fluid samples, gas samples, solid samples, electrical samples, and data samples. In the case of physical asset samples, a fluid sample, gas sample, or solid sample may be stored in any type of container that is appropriate, depending on the properties of that particular sample type. In the case of electrical or data asset samples, the samples may need to be stored electronically. For instance, a sample may be stored in a computer file, which may itself further be stored in an appropriate data storage container, such as a flash drive.

Once the current asset sample has been obtained by the field technician, the container the current asset sample is stored in is typically marked with some type of identification. Identification may include a barcode, serial number, textual description, and/or any other type of identification data that may be used to differentiate the current asset sample from other asset samples. The identification data may be affixed to the current asset sample container using any means available, such that the identification data may be reliably associated with the current asset sample.

Figure 5:
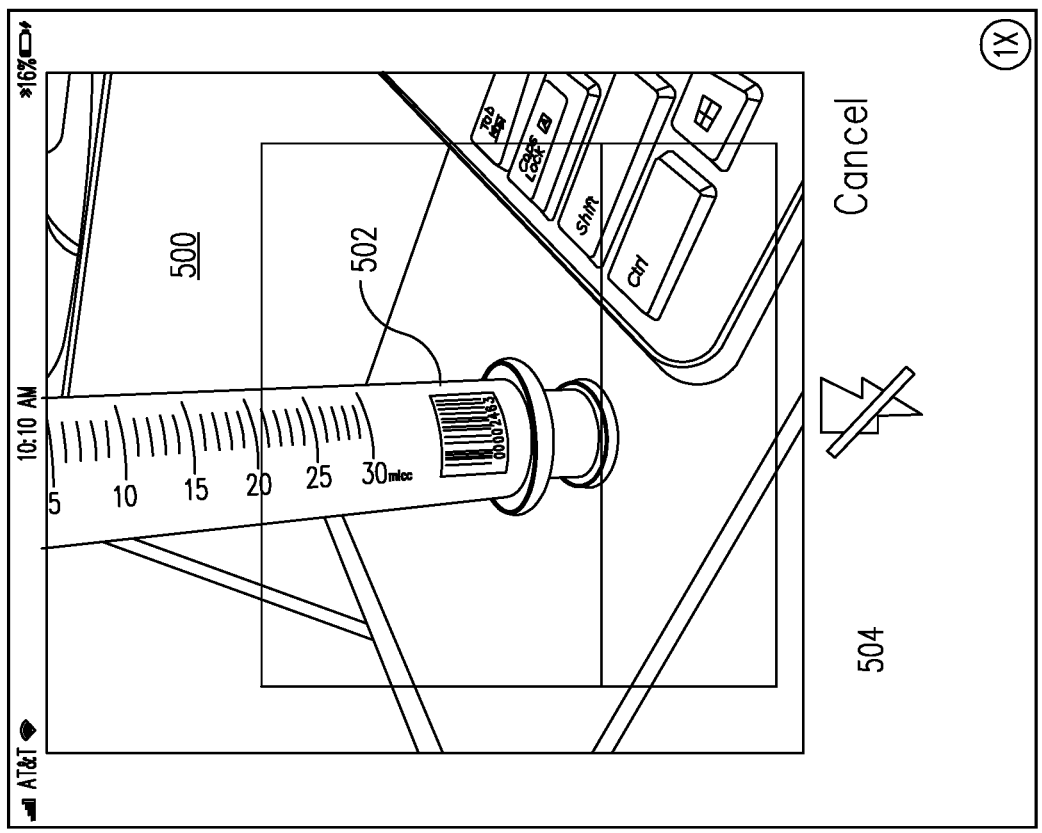
FIG. 5 is a pictorial example of an asset nameplate that may be affixed to an asset, in accordance with one embodiment

FIG. 5 depicts an illustrative example of an asset sample barcode being scanned, in accordance with one embodiment. Referring now to FIG. 4 and FIG. 5 together, once the field technician has selected barcode scan element 404 of sample identification interface 400, a viewfinder, such as viewfinder 504, may be presented to the field technician, which allows the field technician to direct an optical element of a mobile device towards sample identification barcode 502 of asset sample 500 in order to capture the asset sample identification data.

Returning now to FIG. 1, in one embodiment, once current asset sample identification data has been obtained at 110, process flow proceeds to 112. In one embodiment, at 112, current asset identification data is obtained through a user interface of the field management application. The current asset identification data identifies an asset associated with the current asset sample obtained by the field technician at 110.

Figure 6:
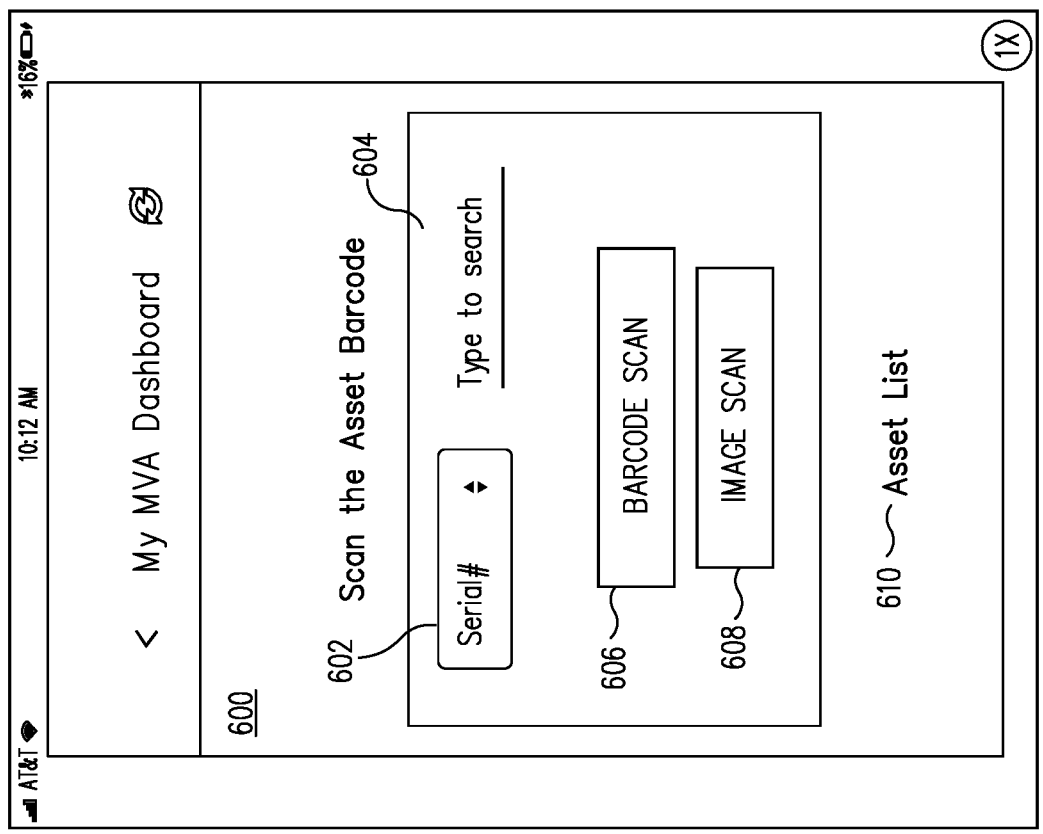
FIG. 6 is an exemplary screenshot of a sample identification interface in accordance with one embodiment.

FIG. 6 depicts an exemplary screenshot of an asset identification interface 600, which is a portion of the field asset management application user interface, and is utilized for obtaining current asset identification data, in accordance with one embodiment. In the exemplary embodiment depicted in FIG. 6, in order to obtain identification data associated with a current asset, the field technician is presented with several options for providing the current asset identification data through the asset identification interface 600. In various embodiments the options include, but are not limited to, manually entering a serial number into serial number field 602, manually entering an alphanumeric string into text search field 604, selecting barcode scan element 606, selecting image scan element 608, or selecting assets list element 610.

In one embodiment, if the field technician elects to identify the current asset using serial number field 602, the field technician may either manually type a serial number into serial number field 602, or the field technician may be able to manually select from one or more stored serial numbers. In one embodiment, if the field technician elects to identify the current asset using text search field 604, the field technician may be presented with a listing of assets that match the text entered by the field technician in text search field 604.

In some embodiments, if the field technician chooses to identify the current asset using barcode scan element 606 or image scan element 608, the field technician may capture the current asset barcode identification data or current asset image identification data using the mobile device that is running the field asset management application. In order to capture the current asset barcode or image identification data, a viewfinder may be presented to the field technician, which allows the field technician to direct an optical element of a mobile device towards a physical portion of the current asset that contains identification information. One example of a physical portion of an asset containing identification information is a nameplate, which is typically affixed to an asset.

Figure 7:
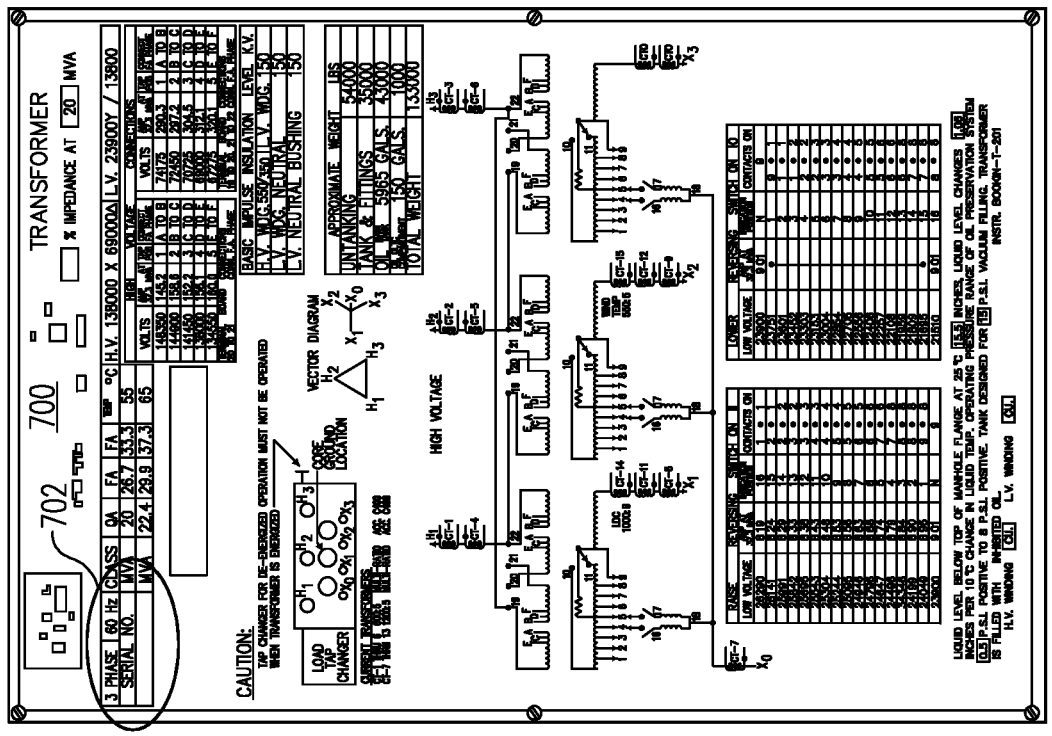
FIG. 7 an illustrative example of an asset sample barcode being scanned, in accordance with one embodiment.

FIG. 7 is a pictorial example of an asset nameplate 700 that may be affixed to an asset, in accordance with one embodiment. An asset nameplate may provide a serial number, such as asset serial number 702 of asset nameplate 700, and typically contains a variety of additional information related to the asset, which may also be used to identify the asset, should a serial number not be present. As such, a barcode or image scan of the nameplate may be used to provide asset identification data.

In various situations, the location of asset serial number 702 may be consistent from nameplate to nameplate on various assets, particularly assets of the same type. In these cases, data field identification formatting, such as JSON formatting, can be utilized to automatically identify the serial number data field and capture data representing asset serial number 702.

Returning to FIG. 6, the field technician may also choose to select asset list element 610 in order to provide current asset identification data. In one embodiment, selecting asset list element 610 from asset identification interface 600 would provide the field technician with a list of assets known to be associated with the field technician. The listing of assets may be obtained by the field asset management application from the known asset database. The field technician would then be able to select the appropriate asset from the asset listing in order to provide the current asset identification data.

In one embodiment, geolocation data may be utilized to identify a current asset based on assets known to be located near the geolocation of the field technician. The field technician may be provided with a listing of determined known nearby assets to select from, and the asset selected by the field technician may then be identified as the current asset. In one embodiment, the current asset may be identified using the field technician's geolocation data without any direct input from the field technician. For example, if only one asset is located near the field technician, that asset may automatically be identified as the current asset. In various embodiments, the geolocation data of the field technician is obtained from the mobile device through which the field asset management application is provided to the field technician.

Returning now to FIG. 1, in one embodiment, once current asset identification data has been obtained at 112, process flow proceeds to 114. In one embodiment, at 114, the current asset identification data is analyzed to determine whether the current asset identified by the current asset identification data exists in the portion of the known asset database associated with the field technician.

In one embodiment, analysis of the current asset identification data is performed by comparing the current asset identification data to the known asset data that is stored in the portion of the known asset database associated with the field technician. In one embodiment, the analysis of the current asset identification data can indicate at least two different outcomes. One outcome is that a match was found between the current asset identification data and an asset already known to be associated with the field technician, and so the analysis at 114 arrives at a determination that the current asset already exists in the portion of the known asset database associated with the field technician. Another possibility is that no match was found between the current asset identification data and any assets known to be associated with the field technician, and so the analysis at 114 arrives at a determination that either some type of error occurred, or that the current asset has not yet been created and/or associated with the field technician in the known asset database.

In one embodiment, once the current asset identification data has been analyzed at 114, process flow proceeds to 116. In one embodiment, at 116, appropriate action is taken depending on whether the outcome of the current asset identification analysis indicated that the current asset exists in the known asset database, or the current asset identification analysis indicated that the current asset does not exist in the known asset database.

In one embodiment, if the outcome of the current asset identification analysis indicates that the current asset does exist in the known asset database, process flow proceeds from 116 to 120, which will be discussed in further detail below. In one embodiment, if the outcome of the current asset identification analysis indicates that the current asset does not exist in the known asset database, process flow proceeds to 117.

In one embodiment, at 117, the field technician may be presented with a notification message through the user interface of the field asset management application indicating that the current asset was not found in the known asset database. Upon receiving the notification message, the field technician may determine that an error occurred in entering the current asset identification data, and the field technician may simply attempt to rescan or retype the current asset barcode and/or serial number, and then operations 112 and 114 discussed above for obtaining and analyzing the current asset identification data would be repeated.

In one embodiment, upon a determination at 117 that the asset was entered correctly, the field technician may be presented with an option to create a new asset through the user interface of the field asset management application, and process flow proceeds to 118. In one embodiment, at 118, new asset creation data is obtained and a new known asset is created and stored in the portion of the known asset database that is associated with the field technician.

FIGS. 8A-8G together depict illustrative examples of various portions of new asset creation interface 800, which may be provided to the field technician through the user interface of the field asset management application, in accordance with one embodiment. Through the new asset creation user interface 800, various new asset creation data fields 802 may be presented to the field technician to enable the field technician to provide requested new asset creation data. New asset creation data requested from the field technician may include data such as, but not limited to, asset serial number, substation location associated with the asset, asset unit ID, asset status, asset equipment type, asset manufacturer, asset year of manufacture, asset power rating, asset capacity, asset fluid type, number of asset phases, and asset breather configuration.

In various embodiments, some of the new asset creation data fields 802 may allow the field technician to enter alphanumeric strings, while other new asset creation data fields 802 may incorporate graphical user elements, such as dropdown lists or scroll wheels, which allow the field technician to select from any number of predefined options.

The illustrative example of FIG. 8A depicts a subset of the new asset creation data fields 802, which, in one embodiment, are presented to the field technician through the new asset creation user interface 800, to allow for the entry of new asset creation data.

The illustrative example of FIG. 8B depicts a subset of the new asset creation data fields 802, which, in one embodiment, are presented to the field technician through the new asset creation user interface 800, to allow for the entry of new asset creation data. Further, upon selection of a particular data field, such as equipment type data field 804, the field technician may be presented with equipment scroll wheel 806, which contains a list of predetermined equipment types, and allows the field technician to select the appropriate equipment type.

Figures 8C, 8D:
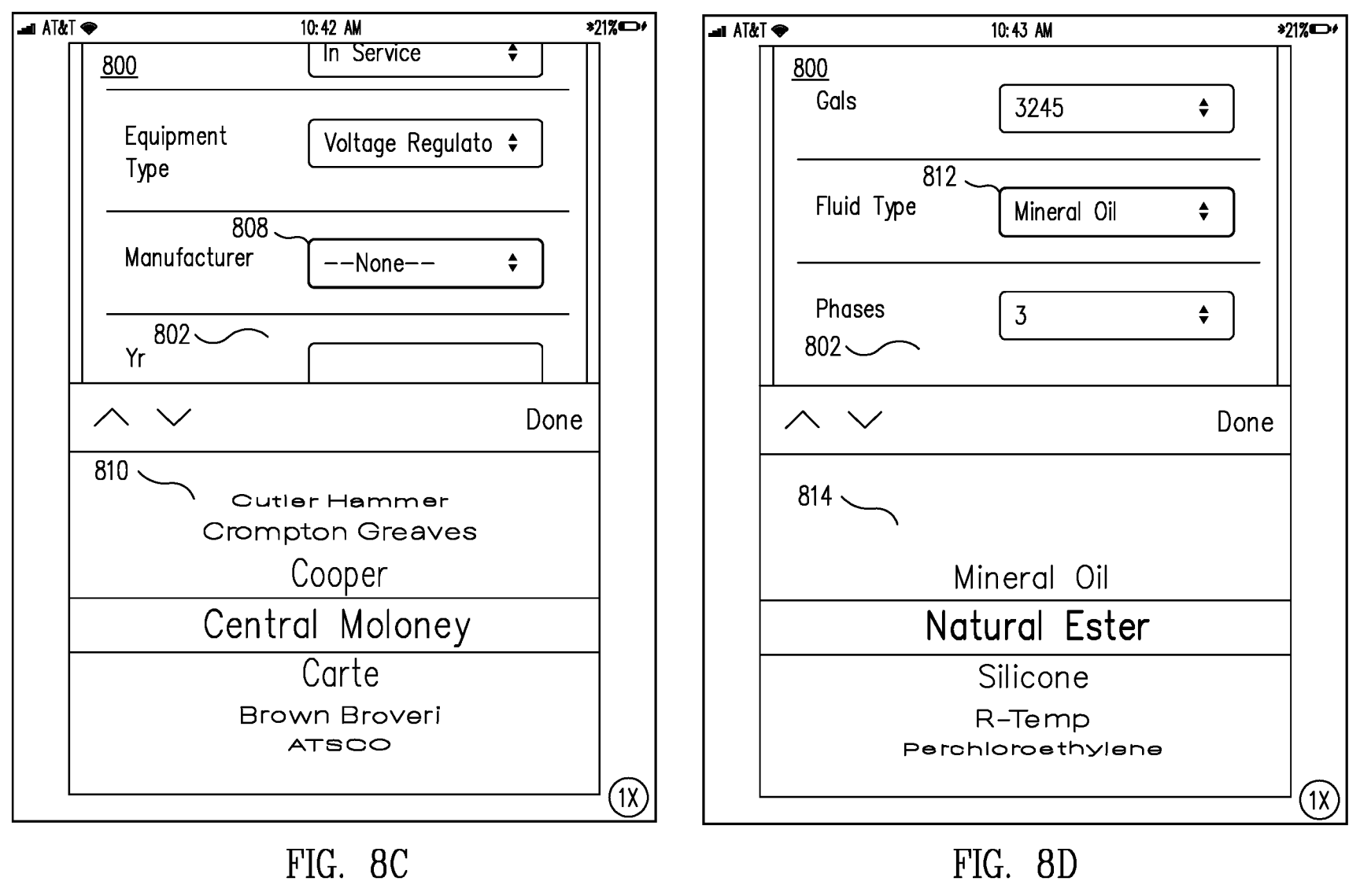

The illustrative example of FIG. 8C depicts a subset of new asset creation data fields 802, which, in one embodiment, are presented to the field technician through the new asset creation user interface 800, to allow for the entry of new asset creation data. Further, upon selection of a particular data field, such as manufacturer data field 808, the field technician may be presented with manufacturer scroll wheel 810, which contains a list of predetermined manufacturers, and allows the field technician to select the appropriate manufacturer.

The illustrative example of FIG. 8D depicts a subset of new asset creation data fields 802, which, in one embodiment, are presented to the field technician through the new asset creation user interface 800, to allow for the entry of new asset creation data. Further, upon selection of a particular data field, such as fluid type data field 812, the field technician is presented with fluid scroll wheel 814, which contains a list of predetermined fluid types, and allows the field technician to select the appropriate fluid type.

The illustrative example of FIG. 8E depicts a subset of new asset creation data fields 802, which, in one embodiment, are presented to the field technician through the new asset creation user interface 800, to allow for the entry of new asset creation data. Further, upon selection of a particular data field, such as breather configuration data field 813, the field technician is presented with breather configuration scroll wheel 815, which contains a list of predetermined types of breather configurations, and allows the field technician to select the appropriate type of breather configuration.

The illustrative example of FIG. 8F, depicts a subset of new asset creation data fields 802, which, in one embodiment, are presented to the field technician through the new asset creation user interface 800, to allow for the entry of new asset creation data. Once the field technician has entered some or all of the requested information into the new asset creation user interface 800, the field technician may be presented with the option to save the new asset creation data through new asset save element 816. In one embodiment, once the field technician has selected new asset save element 816, the new asset creation data may be stored in the portion of the known asset database associated with the field user, and the new known asset becomes a part of the known asset data.

Figure 8G:
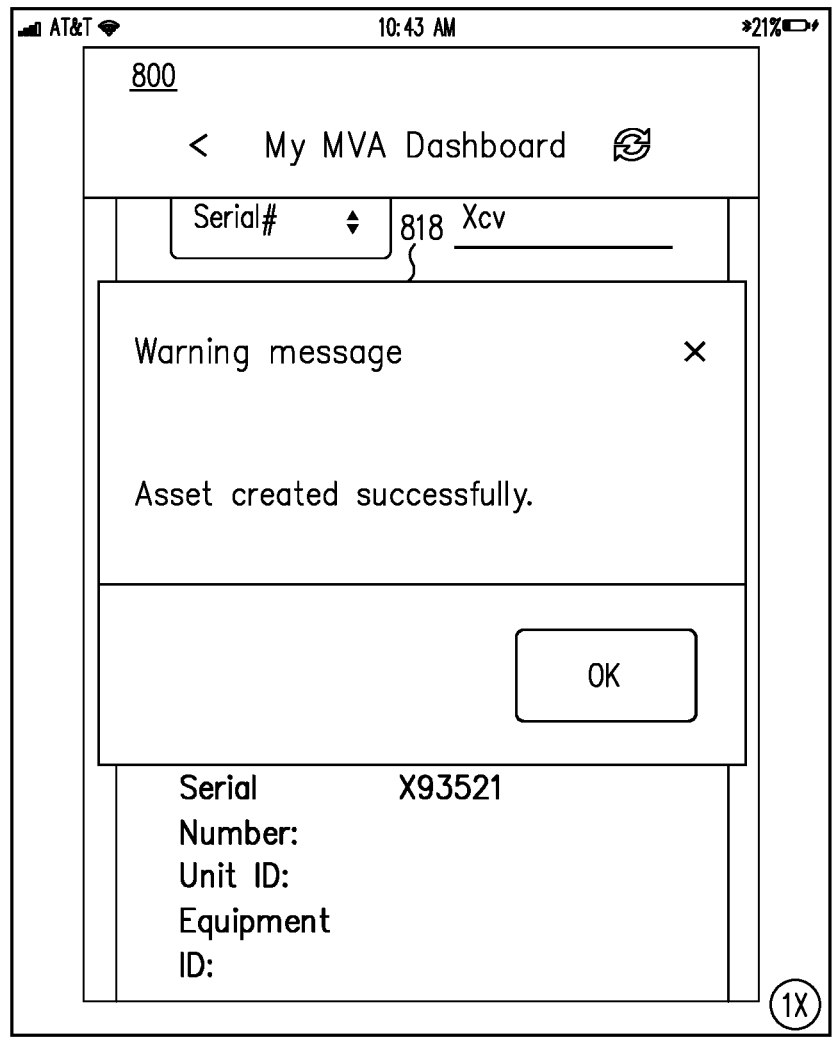

The illustrative example of FIG. 8G, depicts a success notification message 818, which, in some embodiments, is presented to the field technician to inform the field technician that the new known asset was successfully created.

In one embodiment, geolocation data may be utilized to create a new known asset based on assets known to be located near the geolocation of the field technician. The field technician may be provided with a listing of determined known nearby assets to select from, and the asset data associated with the asset selected by the field technician may be used as new asset creation data to create the new known asset. In one embodiment, a new known asset may be created using the field technician's geolocation data without any direct input from the field technician. For example, if only one asset is located near the field technician, that asset may automatically be selected. In various embodiments, the geolocation data of the field technician is obtained from the mobile device through which the field asset management application is provided to the field technician.

Returning to FIG. 1, in one embodiment, upon a determination at 114 that the current asset already exists in the portion of the known asset database associated with the field technician, or upon creation of a new known asset at 118, process flow proceeds to 120. In one embodiment, at 120 the current asset sample identification data previously obtained at 112 is correlated with the current asset identification data either previously obtained at 110, or newly created during the new asset creation process at 118.

In one embodiment, the asset-sample correlation process includes forming an association between the current asset sample identified by the current asset sample identification data, and the current asset identified by the current asset identification data, which results in the generation of correlated asset and sample data. In one embodiment, the correlated asset and sample data may then be stored in the portion of the known asset database associated with the field technician for further processing.

In one embodiment, once current asset sample identification data is correlated with current asset identification data at 120, process flow proceeds to 122. In one embodiment, at 122, test request data is obtained from the field technician indicating one or more tests to be performed on the current asset sample represented by the current asset sample identification data. In various embodiments, the test request data is obtained through a test selection user interface, which is presented to the field technician through the user interface of the first asset management application.

In one embodiment, prior to presenting the field technician with the test selection user interface, the correlated asset and sample data is analyzed to determine which tests are available to be performed for the current asset sample. For example, different types of assets will typically require different types of tests, and different types of samples for the same type of asset will also typically require different types of tests. Therefore, before the field technician can be presented with test options through the test selection user interface, the available types of tests for the current asset sample should be determined. In one embodiment, specific test recommendations might also be provided to the user through the test selection user interface of the field asset management application.

Figure 9B:
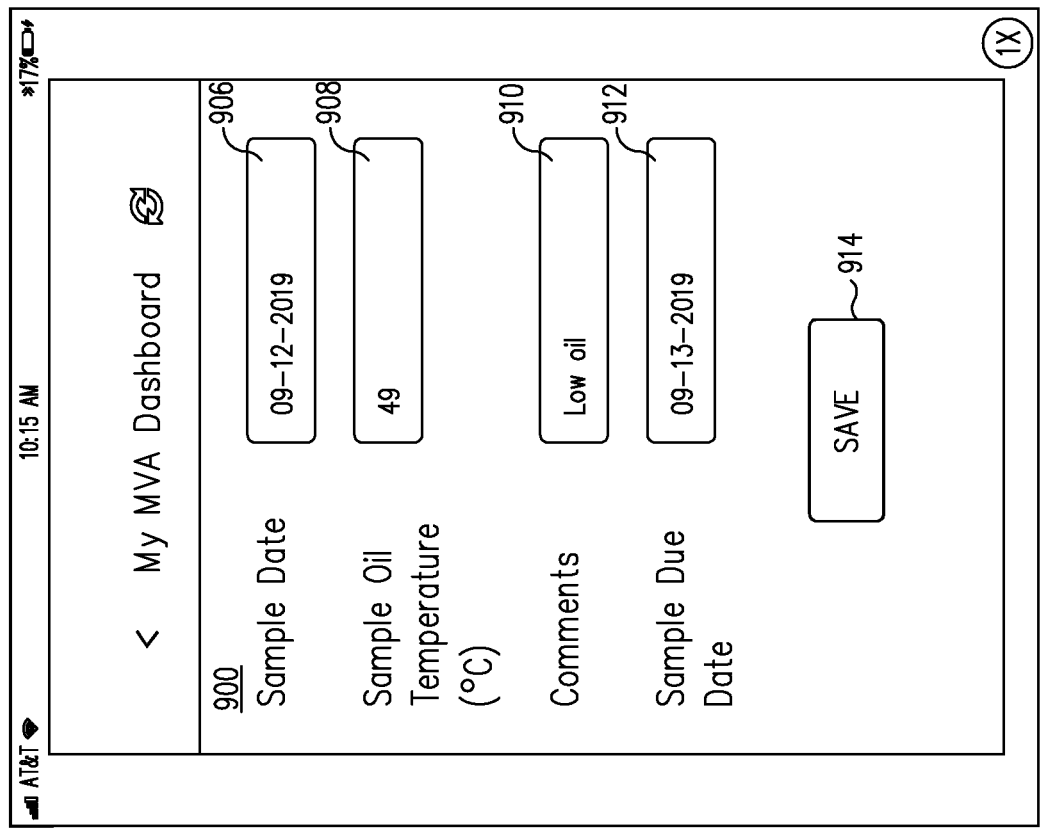
FIG. 9A and FIG. 9B are exemplary screenshots of test selection interfaces, in accordance with one embodiment.
Figure 9A:
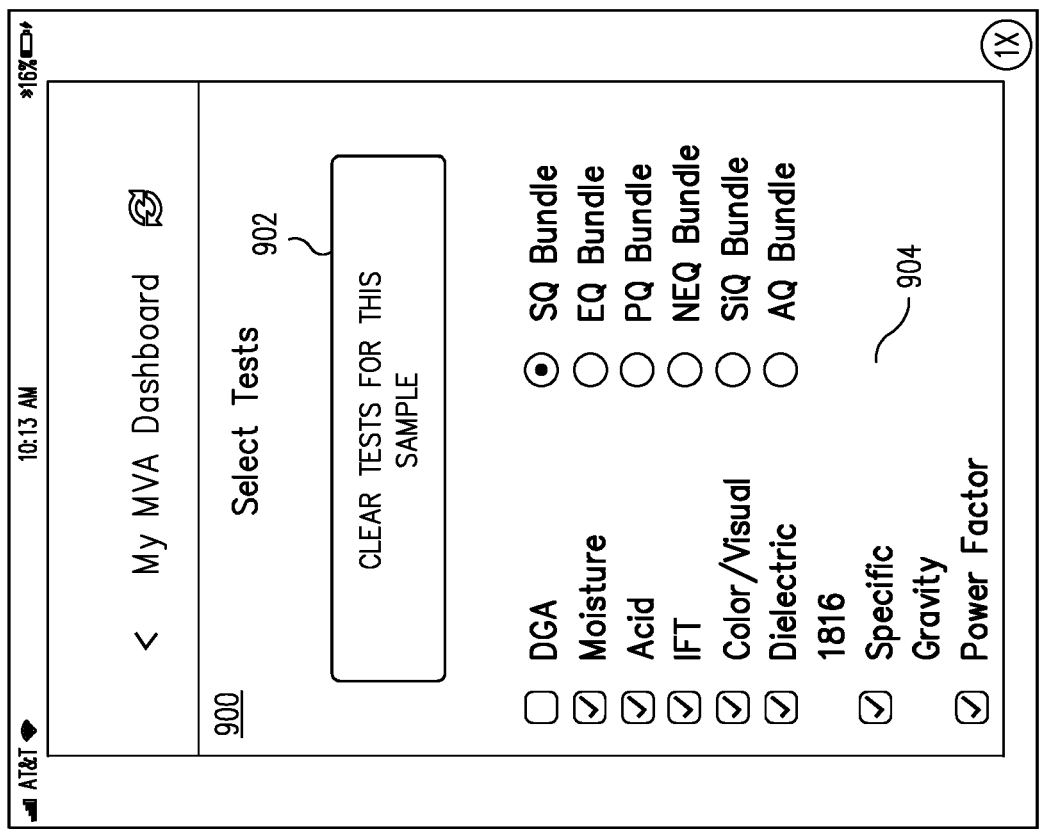

FIG. 9A and FIG. 9B depict illustrative examples of various portions of a test selection user interface 900 provided by the field asset management application, in accordance with one embodiment. In the illustrative embodiment depicted in FIG. 9A and FIG. 9B, the test selection user interface 900 includes sample clearing element 902, sample test options 904, sample date field 906, sample temperature field 908, comments field 910, sample due date field 912, and save element 914. Sample test options 904 may include a variety of user interface elements, such as, but not limited to, checkboxes and radio buttons, which allow a field technician to specify one or more types of tests that they would like to have performed on an asset sample. As noted above, in various embodiments, the types of tests that are listed as available for a field technician to select may vary depending on the specific type of asset associated with the asset sample. Consequently, the test names that are shown as part of sample test options 904 should not be construed as limiting the invention as disclosed herein, and as set forth in the claims below. Sample clearing element 902 is offered to the user for convenience in resetting the test selection user interface 900.

In various embodiments, additional test request data may be requested from a field technician through the test selection user interface 900. Examples of additional test request data that may be requested include, but are not limited to, the date on which the current asset sample was collected, the temperature of the current asset sample on the date the current asset sample was collected, any comments that the field technician may have regarding the current asset sample and/or the test request, and a date that the field technician would like to receive the test results by. In various embodiments, the field technician may enter none, some, or all of these additional pieces of test request data into sample date field 906, sample temperature field 908, comments field 910, and sample due date field 912. Once the field technician has completed providing the test request data, the field technician may save the test request data using save element 914 of the test selection user interface 900. In one embodiment, once the field technician has selected to save the test request data, the test request data may be stored in the portion of the known asset database associated with the field technician.

In one embodiment, once request data is obtained from the field technician through the mobile field asset management application, test request summary data may be provided to the field technician through a user interface of the field asset management application, where the test request summary data summarizes the one or more tests to be performed on the asset sample. In various embodiments, the test request summary data may include current asset identification data, such as equipment type and a serial number associated with the current asset, current asset sample identification data, such as a barcode associated with the current asset sample, a preview of the test options that were selected, and/or any other information regarding the test request that the field technician may wish to review.

Figure 9C:
FIG. 9C is an exemplary screenshot of test request summary data, in accordance with one embodiment.

FIG. 9C depicts an illustrative example of test request summary data 916, which may be provided to the field technician through test selection user interface 900, in accordance with one embodiment.

Returning now to FIG. 1, in one embodiment, once the field technician is provided with test request summary data at 122, process flow proceeds to 124. In one embodiment, at 124, the current asset sample identification data and the current asset identification data are correlated with the test request summary data.

In one embodiment, the asset-sample-test correlation process includes forming an association between the current asset sample identified by the current asset sample identification data, the current asset identified by the current asset identification data, and the test request summary data, which indicates the tests to be run on the current asset sample. The asset-sample-test correlation process results in the generation of correlated asset, sample, and test data. In one embodiment, the correlated asset, sample, and test data may then be stored in the portion of the known asset database associated with the field technician for further processing.

Figure 10:
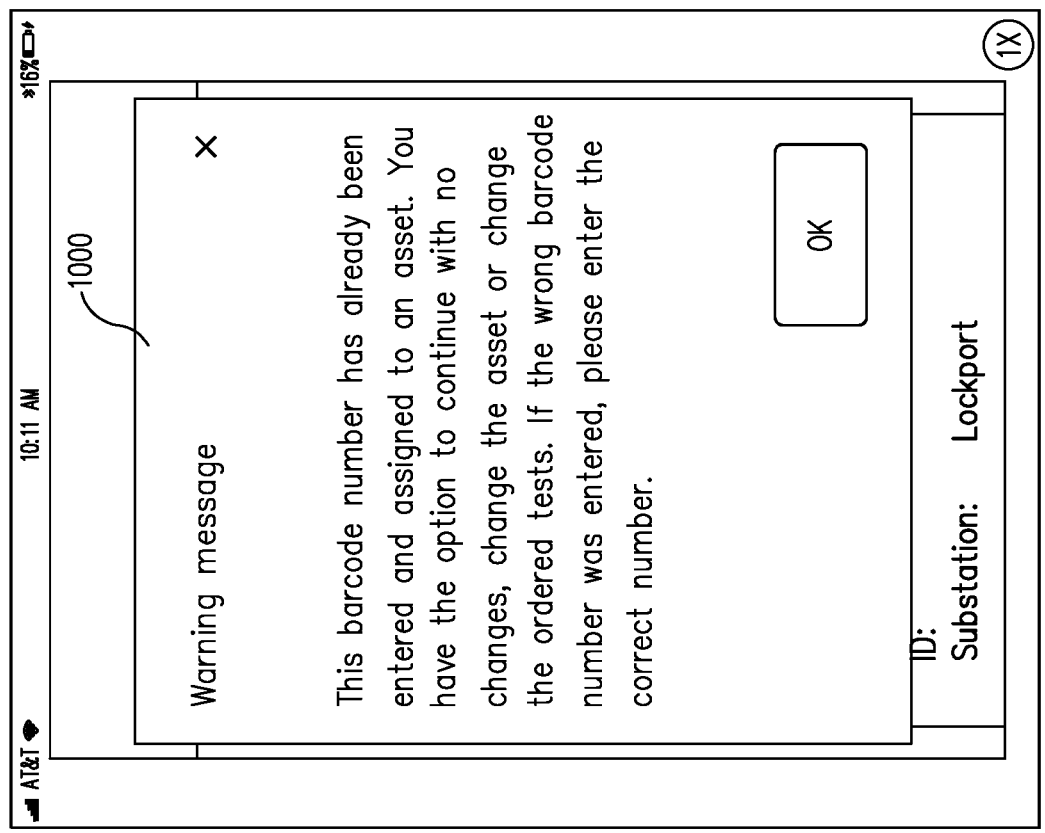
FIG. 10 is an illustrative example of a notification message that may be presented, in accordance with one embodiment.

Either during the asset-sample correlation process at 120, or during the asset-sample-test correlation process at 124, it may be determined that a sample having the same asset sample identification data as the current asset sample has already been correlated with the asset identified by the field technician as the current asset, and the field technician may be presented with a notification to inform the field technician of the possibility that the sample may be a duplicate. FIG. 10 depicts one illustrative example of a notification message 1000 that may be presented to a field technician in such scenarios, in accordance with one embodiment. It should be noted that multiple types of notification messages or alternate wordings of notification messages may be used, other than the one depicted in the illustrative example of FIG. 10.

Figure 11:
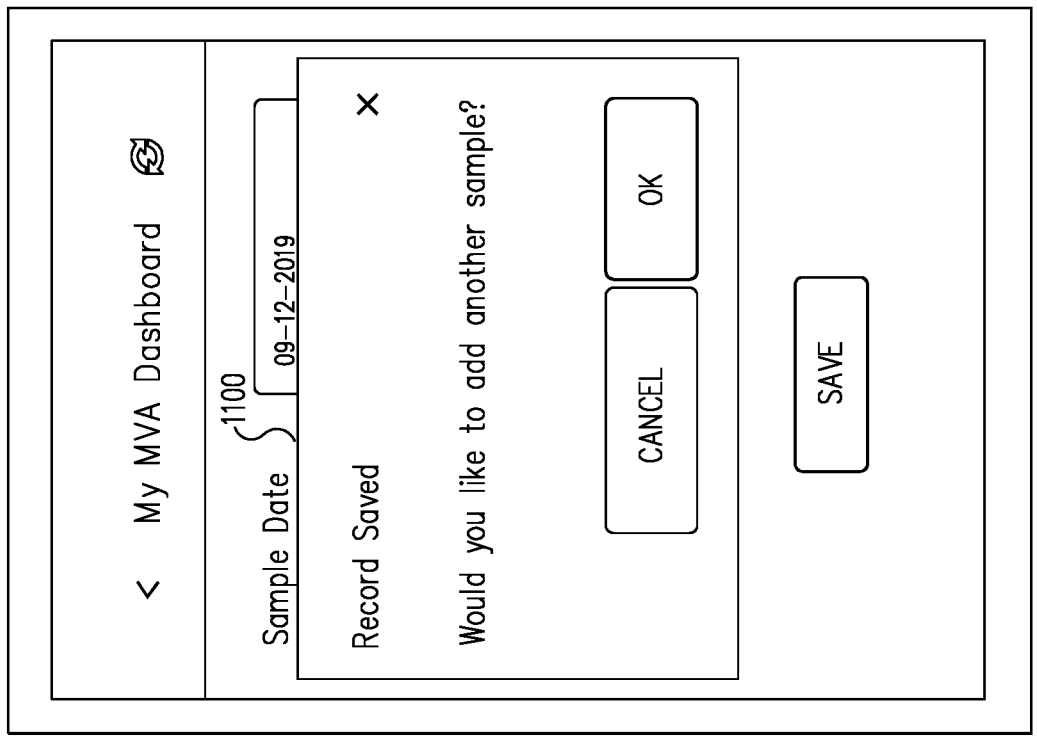
FIG. 11 is an illustrative example of a prompt that may be presented, in accordance with one embodiment.

In one embodiment, once the current asset sample identification data and the current asset identification data have been correlated with the test request summary data at 124, process flow proceeds to 126. In one embodiment, at 126, after the field technician has submitted test request data for the current asset sample, the field technician may be prompted through a user interface of the field application to indicate whether they would like to repeat the process for an additional asset sample. FIG. 11 is an illustrative example of an add sample prompt 1100, which may be presented to the field technician in accordance with one embodiment.

In one embodiment, upon a determination at 126 that the field technician would like to add an additional asset sample, process flow returns to 110, and operations 110, 112, 114, 116, 117, 118, 120, 122, 124, and 126, as discussed above, are repeated.

In one embodiment, upon a determination at 126 that the field technician would not like to process an additional asset sample, the test request data is submitted for processing and process flow proceeds to 128. In one embodiment, at 128, once the field technician has submitted the test request data electronically through the field asset management application, the field technician may also need to deposit the associated physical asset samples to an asset testing service provider for processing. Once the asset testing service provider receives a physical asset sample, the asset testing service provider may access the test request summary data associated with the physical asset sample from the known asset database through the asset management application, and proceed to perform the one or more tests indicated by the test request summary data. Once the one or more tests indicated by the test request summary data have been performed, test results data representing the results of the performed tests may then be stored in the known asset database, or otherwise provided through the asset management application and/or the field asset management application. The test results data may then be reviewed through the asset management application or field asset management application by any parties associated with the asset corresponding to the test results data, such as the asset owner, one or more asset managers, one or more asset technicians, and one or more asset service providers.

In one embodiment, upon a determination at 126 that the field technician would not like to process an additional asset sample, the one or more tests are ordered on the current asset sample, and process flow proceeds to END 130 and the process 100 for acquiring, tracking, and testing asset sample data is exited to await new data and/or instructions.

It should be noted here, that although many of the above discussed operations are described as being performed in the field by a field technician, many of these operations can also be performed by a different party, not located at the site of the current asset. For example, once a field technician has obtained current asset identification data and current asset sample identification data, that data may be correlated and then accessed by an asset owner, an asset manager, an asset technician other than the field technician, or some other type of asset service provider, in order to make decisions about what tests should be run on the current asset sample and provide the test request data.

System

Figure 2A:
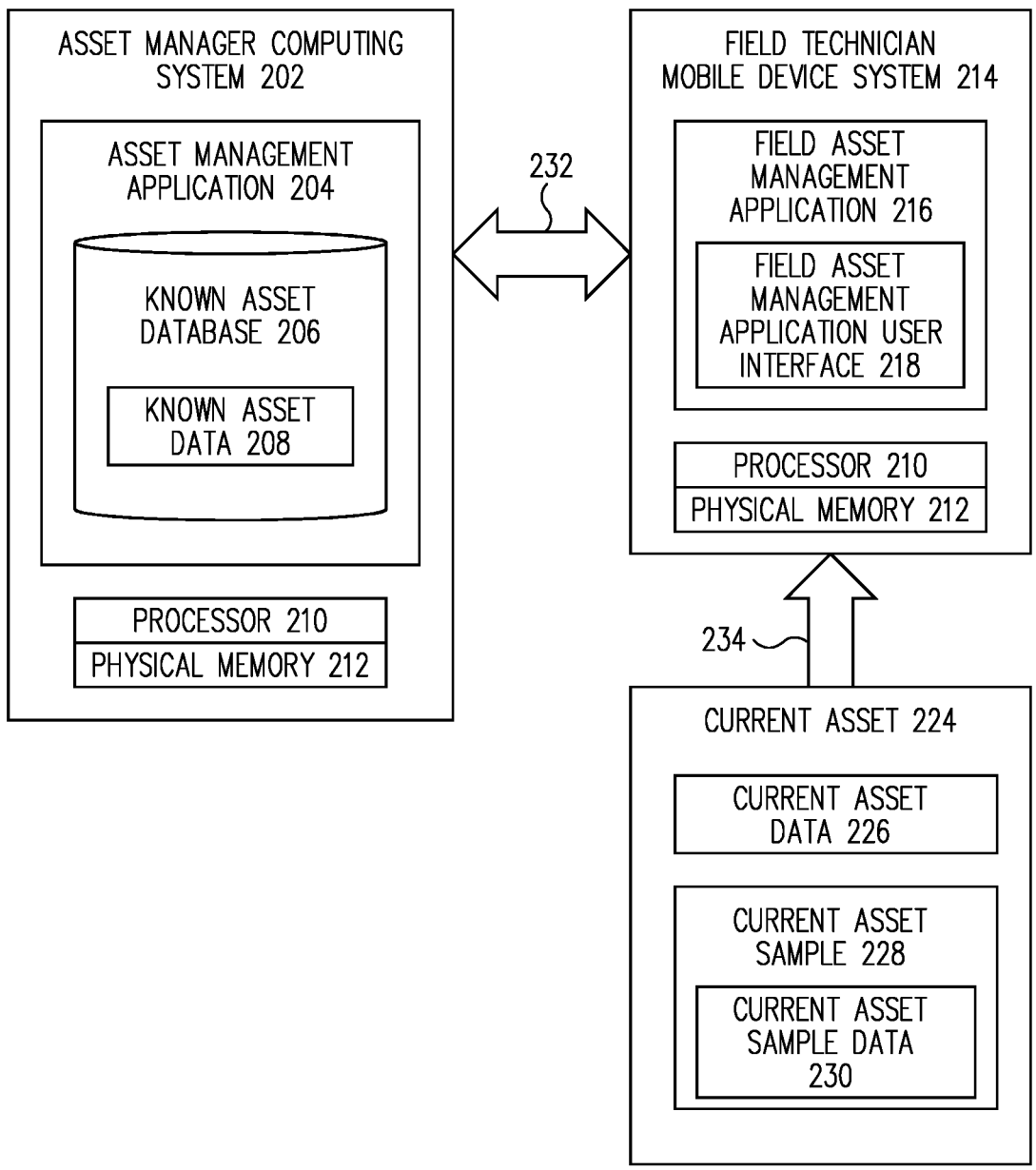
FIG. 2A is a high-level block diagram of a production environment for acquiring, tracking, and testing asset sample data in accordance with one embodiment.

FIG. 2A is a high level block diagram of a production environment 200A for acquiring, tracking, and testing asset sample data in accordance with one embodiment.

In one embodiment, production environment 200A includes asset manager computing system 202. Asset manager computing system 202 includes an instance of asset management application 204, which may be run on asset manager computing system 202. Asset management application 204 includes known asset database 206. Known asset database 206 contains known asset data 208.

In one embodiment production environment 200A also includes field technician mobile device system 214. Field technician mobile device system 214 includes an instance of field asset management application 216, which may be run on field technician mobile device system 214. Field asset management application 216 includes field asset management application user interface 218. Both asset manager computing system 202 and field technician mobile device system 214 include one or more processors 210 and one or more physical memories 212, which coordinate the operation and interaction of the data and data processing modules associated with asset management application 204 and field asset management application 216.

In one embodiment, production environment 200A further includes current asset 224. Current asset data 226 is data associated with current asset 224. Current asset 224 contains current asset sample 228. Current asset sample data 230 is data associated with current asset sample 228. Asset manager computing system 202 and/or asset management application 204 may be communicatively coupled to field technician mobile device system 214 and/or field asset management application 216 through one or more communication networks 232. Current asset data 226, current asset sample 228, and current asset sample data 230 may be retrieved by a field technician operating field technician mobile device system 214 through one or more retrieval mechanisms 234.

Embodiments of the present disclosure provide an effective and efficient technical solution to the technical problem of maintaining asset functionality through the acquisition, tracking, and testing of asset sample data. In the disclosed embodiments, asset data is obtained for assets associated with an asset manager through asset management application 204, which may be run on asset manager computing system 202. The asset data for assets associated with the asset manager is stored as known asset data 208 in known asset database 206. The known asset database 206 enables tracking and maintenance of the assets associated with the asset manager.

In one embodiment, a field technician who has been associated, through asset management application 204, with one or more assets in the known asset database 206, is provided with field asset management application user interface 218 through field asset management application 216, which may be run on field technician mobile device system 214. Field asset management application user interface 218, allows the field technician to obtain current asset data 226 and current asset sample data 230 from current asset 224 and current asset sample 228, through one or more retrieval mechanisms 234. The current asset sample data 230 is then correlated with the current asset data 226. In one embodiment, once the current asset sample data 230 has been correlated with the current asset data 226, the field technician is presented with field asset management application user interface 218 through field asset management application 216, which allows the field technician to place one or more requests for tests to be performed on the current asset sample 228. Once the one or more tests have been performed, test results data is provided through the asset management application 204 and/or the field asset management application 216.

Figure 2B:
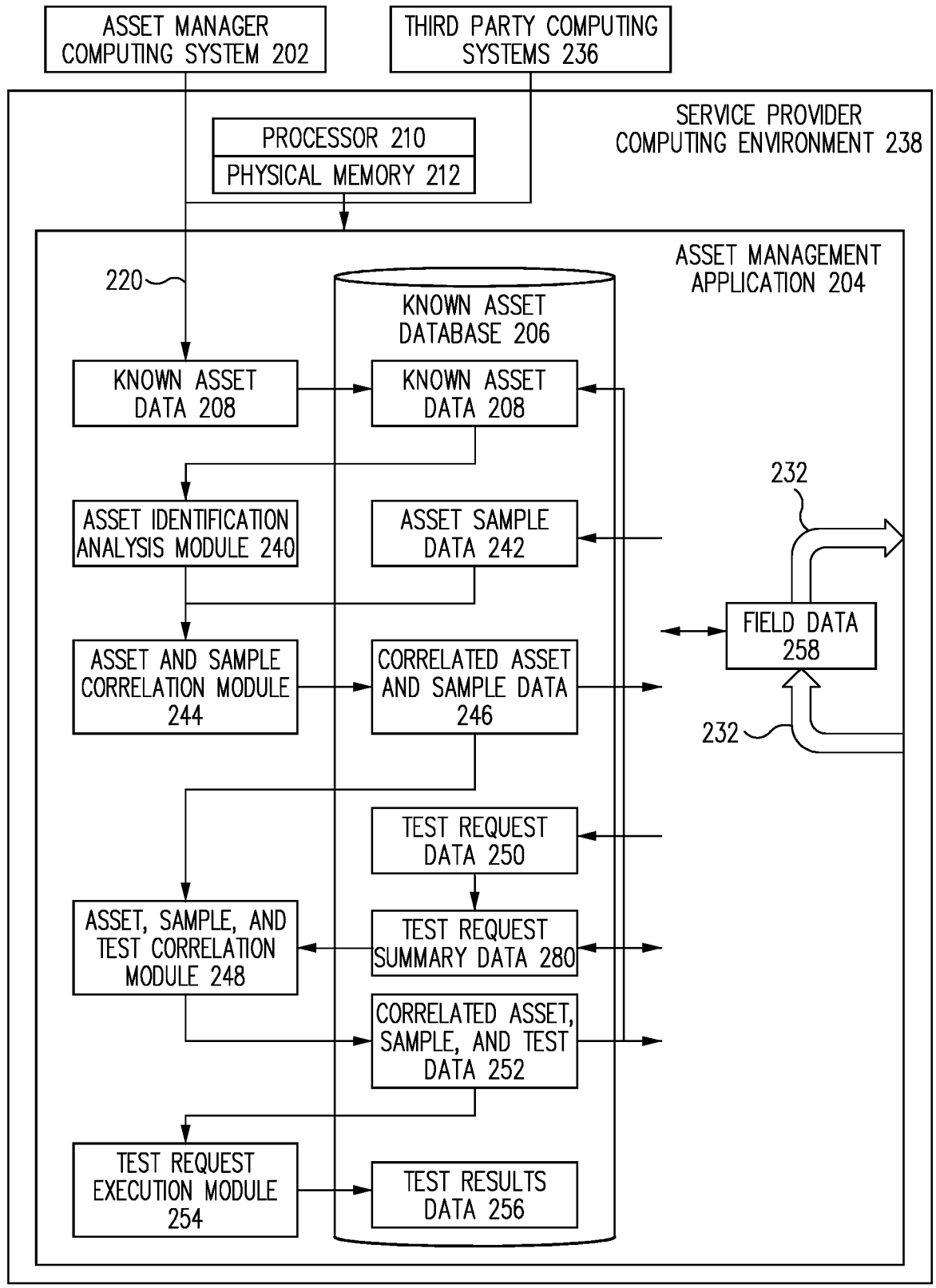
FIG. 2B is a block diagram of a production environment, which provides a more detailed view of the operation of the asset management application, in accordance with one embodiment.

FIG. 2B is a block diagram of a production environment 200B, which provides a more detailed view of the operation of asset management application 204, in accordance with one embodiment.

In one embodiment, production environment 200B includes asset manager computing system 202, third party computing systems 236, and service provider computing environment 238. Service provider computing environment 238 further includes asset management application 204, and one or more processors 210 and physical memories 212, which coordinate the operation and interaction of the data and data processing modules associated with asset management application 204. Asset manager computing system 202, third party computing systems 236, and service provider computing environment 238 are communicatively coupled with one or more communication networks 220.

In one embodiment, asset management application 204 includes asset identification analysis module 240, asset and sample correlation module 244, asset, sample, and test correlation module 248, and test request execution module 254, each of which will be discussed in further detail below.

Additionally, in one embodiment, asset management application 204 includes known asset data 208, asset sample data 242, correlated asset and sample data 246, test request data 250, test request summary data 280, correlated asset, sample, and test data 252, and test results data 256, each of which will be discussed in further detail below. In some embodiments, known asset data 208, asset sample data 242, correlated asset and sample data 246, test request data 250, test request summary data 280, correlated asset, sample, and test data 252, and test results data 256 may be stored in known asset database 206, which includes data associated with one or more assets managed by an asset manager. In one embodiment, asset management application 204 also includes field data 258, which will also be discussed in further detail below. In one embodiment, field data 258 includes data generated from correlation modules 244 and 248 of asset management application 204, such as correlated asset and sample data 246, test request summary data 280, and correlated asset sample, and test data 252.

Figure 2C:
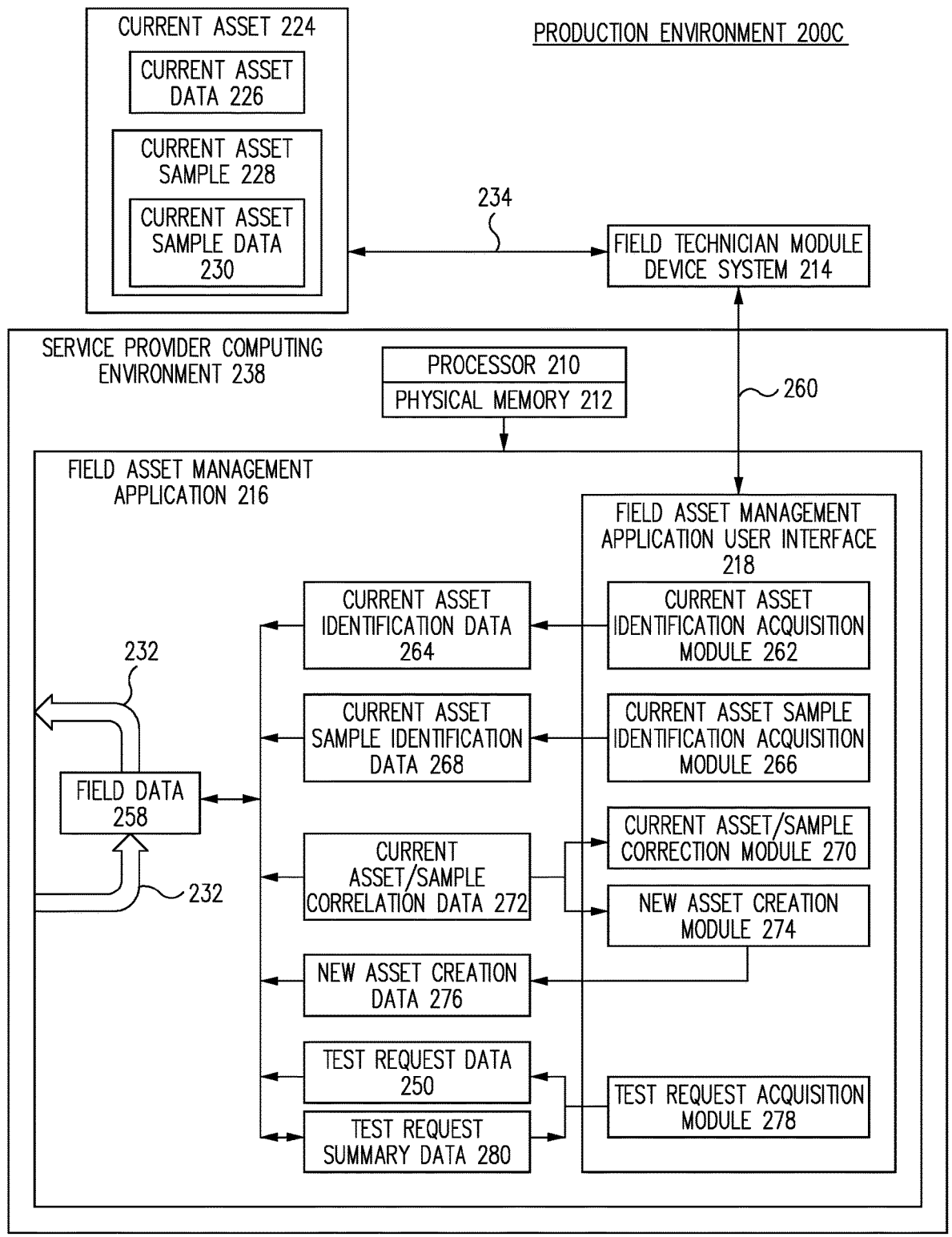
FIG. 2C is a block diagram of a production environment, which provides a more detailed view of the operation of the field asset management application, in accordance with one embodiment.

Referring now to FIG. 2B and FIG. 2C together, in one embodiment, asset manager computing system 202 and/or asset management application 204 may be communicatively coupled to field technician mobile device system 214 and/or field asset management application 216 through one or more communication networks 232, which allows for transfer of field data 258 to or from asset management application 204.

FIG. 2C is a block diagram of a production environment 200C, which provides a more detailed view of the operation of field asset management application 216, in accordance with one embodiment.

In one embodiment, production environment 200C includes current asset 224, current asset data 226, current asset sample 228, and current asset sample data 230. In one embodiment, production environment 200C also includes field technician mobile device system 214 and service provider computing environment 238. Current asset data 226, current asset sample 228, and current asset sample data 230 may be retrieved by a field technician operating field technician mobile device system 214 through one or more retrieval mechanisms 234. Service provider computing environment 238 further includes field asset management application 216, and one or more processors 210 and physical memories 212, which coordinate the operation and interaction of the data and data processing modules associated with field asset management application 216. Field technician mobile device system 214 and service provider computing environment 238 are communicatively coupled by one or more communication networks 260.

In one embodiment, field asset management application 216 includes field asset management application user interface 218, which further includes current asset identification acquisition module 262, current asset sample identification acquisition module 266, current asset/sample correction module 270, new asset creation module 274, and test request acquisition module 278, each of which will be discussed in further detail below.

Additionally, in one embodiment, field asset management application 216 includes current asset identification data 264, current asset sample identification data 268, current asset/sample correlation data 272, new asset creation data 276, test request data 250, test request summary data 280, and field data 258, each of which will be discussed in further detail below. In one embodiment, field data 258 includes data generated through modules 262, 266, 270, 274, and 278 of field asset management application user interface 218, such as current asset identification data 264, current asset sample identification data 268, new asset creation data 276, test request data 250, and test request summary data 280.

Referring now to FIGS. 2B and 2C together, in one embodiment, field technician mobile device system 214 and/or field asset management application 216 may be communicatively coupled to asset manager computing system 202 and/or asset management application 204 through one or more communication networks 232, which allows for transfer of field data 258 from or to field asset management application 216.

Referring now to FIG. 2B, and the discussion above with respect to FIG. 1, in one embodiment an asset manager is provided with access to asset management application 204 through the asset manager computing system 202. As discussed above, and as used herein, the term "asset manager" may refer to an owner of one or more assets, a manager of one or more assets, a technician responsible for servicing one or more assets, and/or any other asset service provider. In various embodiments, asset management application 204 may be any type of application that is capable of providing and receiving information to/from asset manager computing system 202 through a user interface. In one embodiment, once an asset manager associated with asset manager computing system 202 is provided with access to asset management application 204, known asset data 208, which is data associated with known assets managed by the asset manager associated with asset manager computing system 202, is obtained and stored as known asset data 208 in known asset database 206. In various embodiments, asset management application 204 may obtain data associated with the asset manager of asset manager computing system 202 in addition to obtaining known asset data 208.

In some embodiments, in addition to, or instead of, known asset data 208 being obtained directly from the asset manager associated with asset manager computing system 202, known asset data 208 may be obtained from one or more third party computing systems 236. In one embodiment, once known asset data 208 is obtained from one or more asset managers and stored in known asset database 206, a field technician associated with an asset in the known asset database 206 is provided with one or more mobile user interfaces through a field asset management application.

Referring now to FIG. 2C, and the discussion above with respect to FIG. 1, a field technician associated with field technician mobile device system 214 may access field asset management application 216 through field asset management application user interface 218. As already discussed above, and as used herein, the term "field technician" may refer to an asset owner, asset manager, asset technician, or other asset service provider who is responsible for collecting asset sample data in the field using the field asset management application 216 on field technician mobile device system 214.

In one embodiment, field asset management application 216 is an application provided on a mobile device, and the mobile device may be any type of device that is portable and capable of providing and receiving information to/from field technician mobile device system 214 through field asset management application user interface 218.

In one embodiment, once the field technician associated with field technician mobile device system 214 is provided with field asset management application user interface 218, the field technician may be prompted to enter authentication credentials in order to proceed. Once the field technician has provided their authentication credentials, current asset sample identification data 268 is obtained through current asset sample identification acquisition module 266, which is provided to field technician mobile device system 214 through field asset management application user interface 218. The current asset sample identification data 268 is retrieved through the one or more retrieval mechanisms 234 from current asset sample data 230, and identifies current asset sample 228, which has also been obtained by the field technician through the one or more retrieval mechanisms 234.

In one embodiment, once current asset sample identification data 268 has been obtained from current asset sample data 230 by current asset sample identification acquisition module 266 of field asset management application user interface 218, current asset identification data 264 is obtained through current asset identification acquisition module 262, which is provided to the field technician mobile device system 214 through field asset management application user interface 218. The current asset identification data 264 is retrieved through the one or more retrieval mechanisms 234 from current asset data 226, and identifies the current asset 224 associated with the current asset sample 228 obtained by the field technician.

In one embodiment, geolocation data may be utilized to identify current asset 224 based on assets known to be located near the geolocation of the field technician. In one embodiment, the current asset 224 may be identified using the field technician's geolocation data without any direct input from the field technician.

In one embodiment, once current asset identification data 264 has been obtained from current asset data 226 by current asset identification acquisition module 262 of field asset management application user interface 218

Referring now to FIG. 2B and FIG. 2C together, and the discussion above with respect to FIG. 1, in one embodiment, once current asset identification data 264 has been obtained from current asset data 226 by current asset identification acquisition module 266 of field asset management application user interface 218, the current asset sample identification data 268 and the current asset identification data 264 are stored as part of field data 258, which will be sent to asset management application 204 over the one or more communication networks 232. Once field data 258 is received by asset management application 204, asset identification analysis module 240 compares the field data 258 to the known asset data 208 to determine whether the current asset 224 identified by the current asset identification data 264 exists in the known asset database 206.

In one embodiment, analysis of the current asset identification data 264 is performed by asset identification analysis module 240 by comparing the current asset identification data 264 to the known asset data 208 that is stored in the portion of the known asset database 206 associated with the field technician. In one embodiment, the analysis of the current asset identification data 264 by asset identification analysis module 240 can indicate at least two different outcomes. One outcome is that a match was found between the current asset identification data 264 and an asset identified in the known asset data 208 that is stored in the portion of the known asset database 206 that is associated with the field technician, and so the asset identification analysis module 240 arrives at a determination that the current asset 224 already exists in the portion of the known asset database 206 associated with the field technician. Another outcome is that no match was found between the current asset identification data 264 and any assets identified in the known asset data 208 of known asset database 206, and so the asset identification analysis module 240 arrives at a determination that either some type of error occurred, or that the current asset 224 has not yet been created and/or associated with the field technician operating field technician mobile device system 214 in the known asset database 206.

In one embodiment, once the current asset identification data 264 has been analyzed, appropriate action is taken depending on whether the outcome of the asset identification analysis module 240 indicated that the current asset 224 exists in the known asset database 206, or indicated that the current asset 224 does not exist in the known asset database 206.

In one embodiment, if the outcome of asset identification analysis module 240 indicates that the current asset 224 does not exist in the known asset database 206, this data may be passed through field data 258 over communication networks 232 to provide field technician mobile device system 214 with a notification message through the field asset management application user interface 218. Upon receiving the notification message, the field technician may determine that an error occurred in entering the current asset identification data 264, and the field technician may simply attempt to rescan or retype the current asset barcode and/or serial number through current asset/sample correction module 270 of field asset management application user interface 218.

In one embodiment, if the outcome of asset identification analysis module 240 indicates that the current asset 224 does not exist in the known asset database 206, then the field technician may be presented with an option to create a new asset through new asset creation module 274 of field asset management application user interface 218. New asset creation module 274 obtains new asset creation data 276 to create a new known asset, which is represented by new asset creation data 276, and is initially stored in field data 258. Field data 258 is then transmitted over communication channels 232, received by asset management application 204, and stored in the portion of known asset database 206 that is associated with the field technician operating field technician mobile device system 214.

In one embodiment, upon a determination that the current asset 224 already exists in the portion of the known asset database 206 associated with the field technician mobile device system 214, or upon creation of new known asset data 208 through new asset creation module 274, the current asset sample identification data 268 previously obtained is correlated with the current asset identification data 264 either previously obtained by current asset identification acquisition module 262, or newly created through new asset creation module 274.

Returning now to FIGS. 2B and 2C together, in one embodiment, the asset-sample correlation process performed by asset and sample correlation module 244 of FIG. 2B includes forming an association between current asset identification data 264 and current asset sample identification data 268, retrieved from field data 258, which results in the generation of correlated asset and sample data 246, and may then be stored as part of known asset database 206 and/or field data 258.

In one embodiment, once current asset sample identification data 268 is correlated with current asset identification data 264, resulting in correlated asset and sample data 246, test request acquisition module 278 of FIG. 2C requests test request data 250 from the field technician associated with field technician mobile device system 214. In various embodiments, the test request data 250 is obtained through a test selection user interface, which is presented to a field technician associated with field technician mobile device system 214, through the field asset management application user interface 218 of the field asset management application 216.

In one embodiment, upon submission of test request data 250 to the known asset database 206 through field data 258 over one or more communications networks 232, test request data 250 is processed to generate test request summary data 280, which is then provided to field technician mobile device system 214 through field data 258 over the one or more communications networks 232. Test request summary data 280 summarizes the options and instructions for the one or more tests to be performed on the current asset sample 228 represented by the current asset sample identification data 268. In various embodiments, the test request summary data 280 may include the current asset identification data 264, the current asset sample identification data 268, a preview of the test options that were selected in test request data 250, and/or any other information regarding the one or more test requests that the field technician or other party may wish to review.

In one embodiment, upon confirmation by the field technician of the test request summary data 280, the current asset sample identification data 268 and the current asset identification data 264 are correlated with the test request summary data 280, resulting in correlated asset, sample, and test data 252, stored in the known asset database 206 of FIG. 2B.

In one embodiment, once the current asset sample identification data 268 and the current asset identification data 264 have been correlated with the test request summary data 280, after the field technician has submitted test request data 250 for the current asset sample 228 through test request acquisition module 278 of the field asset management application 216, the field technician may be prompted through the field asset management application user interface 218 to indicate whether they would like to repeat the process for an additional asset sample.

In one embodiment, upon a determination that the field technician would not like to process an additional asset sample, correlated asset, sample, and test data 252 is submitted for processing by test request execution module 254. In one embodiment, once the field technician associated with field technician mobile device system 214 has confirmed the test request summary data 280 electronically through the test request acquisition module 278 of field asset management application user interface 218, the field technician may also need to deposit one or more associated physical asset samples to an asset testing service provider for processing.

Once the asset testing service provider receives physical current asset sample 228, the asset testing service provider may access the test request summary data 280 and/or the correlated asset, sample, and test data 252 associated with the physical current asset sample 228 from known asset database 206 through asset management application 204, and the asset testing service provider may proceed to perform the one or more tests indicated by test request summary data 280. Once the one or more tests indicated by test request summary data 280 have been performed, test results data 256 representing the results of the performed tests may then be stored in known asset database 206, or otherwise provided through asset management application 204 and/or field asset management application 216. The test results data 256 may then be reviewed through asset management application 204 or field asset management application 216 by any parties associated with the asset corresponding to the test results data 256, such as the asset owner, one or more asset managers, one or more asset technicians, and one or more asset service providers.

The embodiments disclosed herein provide an effective and efficient technical solution to the technical problem of maintaining asset functionality through the acquisition, tracking, and testing of asset sample data. The embodiments disclosed herein are not an abstract idea, and are well-suited to a wide variety of practical applications. Further, many of the embodiments disclosed herein require processing and analysis of large numbers of assets, asset samples, asset tests, and many combinations thereof. Thus, the technical solution disclosed herein cannot be implemented solely by mental steps or pen and paper, is not an abstract idea, and is, in fact, directed to providing technical solutions to long-standing technical problems associated with maintaining asset functionality through the acquisition, tracking, and testing of asset sample data.

Additionally, the disclosed method and system for acquisition, tracking, and testing of asset sample data requires a specific process comprising the aggregation and detailed analysis of large quantities of asset, asset sample, and asset test data, and as such, does not encompass, embody, or preclude other forms of innovation in the area of asset maintenance. Further, the disclosed embodiments of systems and methods for acquisition, tracking, and testing of asset sample data are not abstract ideas for at least several reasons.

First, effectively and efficiently acquiring and tracking asset samples is not an abstract idea because it is not merely an idea in and of itself. For example, the process cannot be performed mentally or using pen and paper, as it is not possible for the human mind to identify, process, and analyze all possible combinations of user assets, user asset samples, and asset testing data, even with pen and paper to assist the human mind and even with unlimited time.

Second, effectively and efficiently acquiring and tracking asset samples is not a fundamental economic practice (e.g., is not merely creating a contractual relationship, hedging, mitigating a settlement risk, etc.).

Third, effectively and efficiently acquiring and tracking asset samples is not merely a method of organizing human activity (e.g., managing a game of bingo). Rather, in the disclosed embodiments, the method and system for effectively and efficiently acquiring, tracking, and testing asset samples provides a tool that significantly improves the field of asset maintenance. Through the disclosed embodiments, asset managers and/or technicians are provided with a method and system for effectively and efficiently acquiring, tracking, and testing asset samples, which reduces the burden placed on the technicians performing this task and further reduces instances of incorrect or missing data, thus ensuring that the assets continue to operate safely and effectively. As such, the method and system disclosed herein is not an abstract idea, and also serves to integrate the ideas disclosed herein into practical applications of those ideas.

Fourth, although mathematics may be used to implement the embodiments disclosed herein, the systems and methods disclosed and claimed herein are not abstract ideas because the disclosed systems and methods are not simply a mathematical relationship/formula.

It should be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method comprising:
 storing known asset data associated with one or more assets in a known asset database accessible by a field asset management application;
 providing a field technician with access to the field asset management application on a mobile device;
 collecting, by the field technician, a current asset sample, wherein the current asset sample is collected from a current asset;
 processing the current asset sample during collection of the current asset sample by the field technician, wherein processing the current asset sample includes:
  utilizing the field asset management application to obtain, from the field technician, current asset sample identification data identifying the current asset sample collected by the field technician from the current asset;
  utilizing the field asset management application to obtain, from the field technician, current asset identification data identifying the current asset from which the current asset sample was collected;
  utilizing the field asset management application to obtain known asset data from the known asset database wherein the known asset data includes data associated with the current asset identified by the current asset identification data;
  correlating the current asset sample identification data with the known asset data associated with the current asset;
  utilizing the field asset management application to obtain test request data, the test request data representing requests for one or more tests to be run on the current asset sample; and
  correlating the current asset sample identification data and the known asset data associated with the current asset with the test request data;
 providing the current asset sample to a testing service provider for processing;
 performing, by the testing service provider, the one or more tests on the current asset sample; and
 providing test results data representing the results of the one or more tests run on the current asset sample.

2. The computing system implemented method of claim 1 wherein the known and current assets are assets selected from the group of assets consisting of:
 transformers;
 generators;
 voltage regulators;
 wind turbines;
 vehicle equipment;
 mining equipment;
 hauling equipment;
 farming equipment;
 aviation equipment;
 oil and gas equipment;
 shipboard and marine equipment;
 equipment engines; and
 equipment motors.

3. The computing system implemented method of claim 1 wherein the current asset sample is a current asset sample selected from the group of current asset samples consisting of:
 fluid samples;
 gas samples;
 solid samples;
 electrical samples; and
 data samples.

4. The computing system implemented method of claim 1 wherein obtaining current asset identification data identifying a current asset includes one or more of:
 obtaining current asset textual data identifying the current asset through a user interface of the field asset management application;
 obtaining current asset nameplate image data representing an image of an asset nameplate through a user interface of the field asset management application;
 obtaining current asset image data representing an image of the current asset through a user interface of the field asset management application;
 obtaining current asset identification image data representing an image of the identification data on the current asset through a user interface of the field asset management application;
 obtaining current asset barcode image data representing an image of a current asset barcode associated with the current asset through a user interface of the field asset management application; and
 obtaining current asset barcode data representing data generated by scanning a current asset barcode associated with the current asset through a user interface of the field asset management application.

5. The computing system implemented method of claim 1 wherein obtaining current asset sample identification data identifying a current asset sample includes one or more of:
 obtaining current asset sample textual data identifying the current asset sample through a user interface of the field asset management application;
 obtaining current asset sample image data representing an image of the current asset sample through a user interface of the field asset management application;
 obtaining current asset sample identification image data representing an image of the identification data on the current asset sample through a user interface of the field asset management application;
 obtaining current asset sample barcode image data representing an image of a current asset sample barcode associated with the current asset sample through a user interface of the field asset management application; and
 obtaining current asset sample barcode data representing data generated by scanning a current asset sample barcode associated with the current asset sample through a user interface of the field asset management application.

6. The computing system implemented method of claim 1 further including:
 analyzing the current asset identification data and the known asset data to determine whether the current asset exists in the known asset database.

7. The computing system implemented method of claim 6 wherein analyzing the current asset identification data and the known asset data to determine whether the current asset exists in the known asset database includes comparing the current asset identification data with the known asset data from the known asset database to identify one or more assets that match the asset identification data using one or more Optical Character Recognition systems.

8. The computing system implemented method of claim 6 further including:
 upon a determination that the current asset does not exist in the known asset database, requesting the current asset identification data be checked and re-submitted through a user interface of the field asset management application; and upon a determination that the current asset does not exist in the known asset database after receiving the requested checked and re-submitted current asset identification data, requesting new asset creation data through a new asset creation user interface of the field asset management application, the new asset creation data being used to create a new known asset.

9. The computing system implemented method of claim 8 wherein creating the new known asset includes obtaining new asset creation data that includes the originally submitted current asset identification data and storing the new asset creation data in the known asset database.

10. The computing system implemented method of claim 1 wherein utilizing the field asset management application to obtain test request data includes:
   analyzing the known asset data for the current asset associated with the current asset sample to determine one or more tests that are available to be performed on the current asset sample;
   providing the field technician with a list of the one or more tests that are available to be performed on the current asset sample through a test request user interface of the field asset management application;
   obtaining test request data through the test request user interface of the field asset management application, the test request data representing one or more tests selected to be run on the current asset sample represented by the current asset sample identification data;
   providing, through a user interface of the field asset management application, test request summary data;
   upon confirmation of the test request summary data, correlating the current asset sample identification data and the known asset data associated with the current asset with the test request summary data;
   performing the one or more tests on the current asset sample; and
   providing test results data representing the results of the one or more tests run on the current asset sample through the field asset management application.

11. The computing system implemented method of claim 1 further comprising:
   obtaining geolocation data representing the geolocation of the field technician;
   determining known assets near the geolocation of the field technician;
   providing the field technician, through a user interface of the field asset management application, with a listing of the determined known assets near the geolocation of the field technician; and
   obtaining the current asset identification data identifying an asset from which a current asset sample is to be obtained by the field technician, by the field technician selecting one of the determined known assets near the geolocation of the field technician listed in the listing of the determined known assets near the geolocation of the field technician.

12. The computing system implemented method of claim 11 wherein the geolocation data for the field technician is obtained from the mobile device through which the field asset management application is provided to the field technician.

13. The computing system implemented method of claim 1 further comprising:
   obtaining geolocation data representing the geolocation of the field technician;
   determining a known asset near the geolocation of the field technician; and
   obtaining the current asset identification data identifying an asset from which a current asset sample is to be obtained by the field technician by accessing the known asset identification data associated with the known asset near the geolocation of the field technician.

14. The computing system implemented method of claim 13 wherein the geolocation data for the field technician is obtained from the mobile device through which the field asset management application is provided to the field technician.

15. A system comprising:
   one or more known assets;
   a known asset database accessible by a field asset management application, the known asset database including known asset data associated with the one or more known assets;
   a mobile device, the mobile device being accessible by one or more field technicians;
   a field asset management application, access to the field asset management application being provided to the one or more field technicians through the mobile device, the field asset management application providing one or more user interfaces to the one or more field technicians through the mobile device;
   a current asset, the current asset being an asset from which a current asset sample is collected by a field technician;
   at least one processor; and
   at least one memory coupled to the at least one processor, the at least one memory having stored therein instructions which when executed by any set of the at least one processor, perform a process, the process including:
   providing the field technician with access to the field asset management application on the mobile device;
   processing the current asset sample during collection of the current asset sample by the field technician, wherein processing the current asset sample includes:
      utilizing the field asset management application to obtain, from the field technician, current asset sample identification data identifying the current asset sample collected by the field technician from the current asset;
      utilizing the field asset management application to obtain, from the field technician, current asset identification data identifying the current asset from which the current asset sample was collected;
      utilizing the field asset management application to obtain known asset data from the known asset database wherein the known asset data includes data associated with the current asset identified by the current asset identification data;
      correlating the current asset sample identification data with the known asset data associated with the current asset;
      utilizing the field asset management application to obtain test request data, the test request data representing requests for one or more tests to be run on the current asset sample; and
      correlating the current asset sample identification data and the known asset data associated with the current asset with the test request data to generate current asset sample test request data;
   providing the current asset sample test request data to a testing service provider to enable the testing service provider to perform the one or more tests on the current asset sample; and
   providing test results data representing the results of the one or more tests run on the current asset sample.

16. The system of claim 15 wherein the known and current assets are assets selected from the group of assets consisting of:
- transformers;
- generators;
- voltage regulators;
- wind turbines;
- vehicle equipment;
- mining equipment;
- hauling equipment;
- farming equipment;
- aviation equipment;
- oil and gas equipment;
- shipboard and marine equipment;
- equipment engines; and
- equipment motors.

17. The system of claim 15 wherein the current asset sample is a current asset sample selected from the group of current asset samples consisting of:
- fluid samples;
- gas samples;
- solid samples;
- electrical samples; and
- data samples.

18. The system of claim 15 wherein obtaining current asset identification data identifying a current asset includes one or more of:
- obtaining current asset textual data identifying the current asset through a user interface of the field asset management application;
- obtaining current asset nameplate image data representing an image of an asset nameplate through a user interface of the field asset management application;
- obtaining current asset image data representing an image of the current asset through a user interface of the field asset management application;
- obtaining current asset identification image data representing an image of the identification data on the current asset through a user interface of the field asset management application;
- obtaining current asset barcode image data representing an image of a current asset barcode associated with the current asset through a user interface of the field asset management application; and
- obtaining current asset barcode data representing data generated by scanning a current asset barcode associated with the current asset through a user interface of the field asset management application.

19. The system of claim 15 wherein obtaining current asset sample identification data identifying a current asset sample includes one or more of:
- obtaining current asset sample textual data identifying the current asset sample through a user interface of the field asset management application;
- obtaining current asset sample image data representing an image of the current asset sample through a user interface of the field asset management application;
- obtaining current asset sample identification image data representing an image of the identification data on the current asset sample through a user interface of the field asset management application;
- obtaining current asset sample barcode image data representing an image of a current asset sample barcode associated with the current asset sample through a user interface of the field asset management application; and
- obtaining current asset sample barcode data representing data generated by scanning a current asset sample barcode associated with the current asset sample through a user interface of the field asset management application.

20. The system of claim 15 further including:
- analyzing the current asset identification data and the known asset data to determine whether the current asset exists in the known asset database.

21. The system of claim 20 wherein analyzing the current asset identification data and the known asset data to determine whether the current asset exists in the known asset database includes comparing the current asset identification data with the known asset data from the known asset database to identify one or more assets that match the asset identification data using one or more Optical Character Recognition systems.

22. The system of claim 20 further including:
- upon a determination that the current asset does not exist in the known asset database, requesting the current asset identification data be checked and re-submitted through a user interface of the field asset management application; and
- upon a determination that the current asset does not exist in the known asset database after receiving the requested checked and re-submitted current asset identification data, requesting new asset creation data through a new asset creation user interface of the field asset management application, the new asset creation data being used to create a new known asset.

23. The system of claim 22 wherein creating the new known asset includes obtaining new asset creation data that includes the originally submitted current asset identification data and storing the new asset creation data in the known asset database.

24. The system of claim 15 wherein utilizing the field asset management application to obtain test request data includes:
- analyzing the known asset data for the current asset associated with the current asset sample to determine one or more tests that are available to be performed on the current asset sample;
- providing the field technician with a list of the one or more tests that are available to be performed on the current asset sample through a test request user interface of the field asset management application;
- obtaining test request data through the test request user interface of the field asset management application, the test request data representing one or more tests selected to be run on the current asset sample represented by the current asset sample identification data;
- providing, through a user interface of the field asset management application, test request summary data;
- upon confirmation of the test request summary data, correlating the current asset sample identification data and the known asset data associated with the current asset with the test request summary data;
- performing the one or more tests on the current asset sample; and
- providing test results data representing the results of the one or more tests run on the current asset through the field asset management application.

25. The system of claim 15 further comprising:
- obtaining geolocation data representing the geolocation of the field technician;
- determining known assets near the geolocation of the field technician;

providing the field technician, through a user interface of the field asset management application, with a listing of the determined known assets near the geolocation of the field technician; and obtaining the current asset identification data identifying an asset from which a current asset sample is to be obtained by the field technician, by the field technician selecting one of the determined known assets near the geolocation of the field technician listed in the listing of the determined known assets near the geolocation of the field technician.

26. The system of claim 25 wherein the geolocation data for the field technician is obtained from the mobile device through which the field asset management application is provided to the field technician.

27. The system of claim 15 further comprising:

obtaining geolocation data representing the geolocation of the field technician;

determining a known asset near the geolocation of the field technician; and obtaining the current asset identification data identifying an asset from which a current asset sample is to be obtained by the field technician by accessing the known asset identification data associated with the known asset near the geolocation of the field technician.

28. The system of claim 27 wherein the geolocation data for the field technician is obtained from the mobile device through which the field asset management application is provided to the field technician.

29. A computing system implemented method comprising:

storing known asset data in a known asset database;

providing a field technician with a field asset management application on a mobile device;

collecting, by the field technician, a current asset sample, wherein the current asset sample is collected from a current asset;

processing the current asset sample during collection of the current asset sample by the field technician, wherein processing the current asset sample includes:

obtaining, from the field technician, current asset sample data representing data associated with the current asset sample collected by the field technician from the current asset;

obtaining, from the field technician, current asset data representing the current asset from which the current asset sample was collected;

utilizing the field asset management application to obtain known asset data from the known asset database wherein the known asset data includes data associated with the current asset;

obtaining test request data representing requests for one or more tests to be run on the current asset sample; and correlating the current asset sample data and the current asset data with the test request data;

providing the current asset sample to a testing service provider for processing; and performing, by the testing service provider, the one or more tests on the current asset sample.

\* \* \* \* \*